US008388025B2

(12) United States Patent
Mrocki et al.

(10) Patent No.: US 8,388,025 B2
(45) Date of Patent: Mar. 5, 2013

(54) SECURITY SYSTEM FOR ARTICLES IN TRANSIT

(75) Inventors: Dion Mrocki, Elsternwick (AU); Ben Talintyre, St. Kilda (AU); Rod Anthony Wiebenga, Blackburn (AU)

(73) Assignee: Securoseal Pty Ltd, South Yara, VIC (AU)

( * ) Notice: Subject to any disclaimer, the term of this patent is extended or adjusted under 35 U.S.C. 154(b) by 361 days.

(21) Appl. No.: 12/665,581

(22) PCT Filed: Jun. 19, 2008

(86) PCT No.: PCT/AU2008/000885
§ 371 (c)(1), (2), (4) Date: Dec. 18, 2009

(87) PCT Pub. No.: WO2008/154686
PCT Pub. Date: Dec. 24, 2008

(65) Prior Publication Data

US 2010/0200155 A1 Aug. 12, 2010

(30) Foreign Application Priority Data

Jun. 19, 2007 (AU) ................................ 2007903284
Aug. 6, 2007 (AU) ................................ 2007904211
May 13, 2008 (AU) ................................ 2008902339

(51) Int. Cl.
*G09C 3/00* (2006.01)
*B42D 15/00* (2006.01)
*G09F 3/20* (2006.01)
*G09F 3/08* (2006.01)
*G09F 3/14* (2006.01)

(52) U.S. Cl. .................... 283/80; 283/70; 40/6; 40/663; 40/664; 40/665

(58) Field of Classification Search .................... 283/70, 283/80; 40/6, 663–665; 24/386, 429, 16 PB, 24/30.5 P; 190/101, 120
See application file for complete search history.

(56) References Cited

U.S. PATENT DOCUMENTS 902,965 A 11/1908 Staley
1,353,814 A 9/1920 Emery
(Continued)

FOREIGN PATENT DOCUMENTS

AU 2005100766 A4 10/2005
CA 2015183 A1 10/1991
(Continued)

OTHER PUBLICATIONS

English Translation of Decision on Grant received Jul. 8, 2010 for corresponding Russian Application No. 2008118507, filed Oct. 12, 2006.

(Continued)

*Primary Examiner* — Dana Ross
*Assistant Examiner* — Kyle Grabowski
(74) *Attorney, Agent, or Firm* — David D. Brush; Westman, Champlin & Kelly, P.A.

(57) ABSTRACT

A strip for tamper evidencing has a first layer and one or more reinforcing layers. An adhesive is provided on a first portion of the strip to selectively adhere the first portion of the strip onto the first layer of a second portion of the strip, wherein the first layer is such that removal or attempted removal of the first portion of the strip from the second portion of the strip will be evidenced by the first layer. The reinforcing material may be arranged such that portions of it are bonded to each other at a plurality of locations spaced along the length of the strip. A security system may include a tamper evidencing device and a receipt portion having corresponding unique identifiers, wherein the receipt portion includes a zip tab securing portion for securing zip tabs or luggage locking points and the evidencing device includes a trackable identifier.

19 Claims, 25 Drawing Sheets

U.S. PATENT DOCUMENTS

| | | | | | |
|---|---|---|---|---|---|
| 3,231,992 | A | | 2/1966 | Swett | |
| 3,257,694 | A | * | 6/1966 | Litwin | 24/16 PB |
| 4,065,343 | A | * | 12/1977 | Stumpe | 156/212 |
| 4,081,882 | A | * | 4/1978 | Toepelt et al. | 24/386 |
| 4,379,538 | A | | 4/1983 | Welles | |
| 4,393,548 | A | | 7/1983 | Herb | |
| 4,501,049 | A | | 2/1985 | Adamson | |
| 4,965,115 | A | | 10/1990 | Cimmilo | |
| 5,224,244 | A | | 7/1993 | Ikeda et al. | |
| 5,399,021 | A | | 3/1995 | Litt | |
| 5,451,282 | A | | 9/1995 | Fore | |
| 5,510,768 | A | | 4/1996 | Mann | |
| 5,551,729 | A | * | 9/1996 | Morgan | 283/94 |
| 5,560,657 | A | * | 10/1996 | Morgan | 283/80 |
| 5,683,774 | A | * | 11/1997 | Faykish et al. | 428/40.1 |
| 5,881,435 | A | | 3/1999 | Jermyn, Jr. | |
| 5,882,320 | A | | 3/1999 | Peterson | |
| 5,890,345 | A | | 4/1999 | Bauer | |
| 6,003,208 | A | | 12/1999 | Christian et al. | |
| 6,050,622 | A | | 4/2000 | Gustafson | |
| 6,189,249 | B1 | * | 2/2001 | Hughes | 40/662 |
| 6,196,716 | B1 | | 3/2001 | Geyer | |
| 6,267,505 | B1 | * | 7/2001 | Henson | 383/5 |
| 6,364,365 | B1 | * | 4/2002 | Caplan | 283/80 |
| 6,372,341 | B1 | | 4/2002 | Jung et al. | |
| 6,430,974 | B1 | | 8/2002 | Mitchell et al. | |
| 6,694,655 | B2 | * | 2/2004 | Redburn et al. | 40/664 |
| 6,695,364 | B2 | | 2/2004 | Bierlin | |
| 7,861,835 | B2 | | 1/2011 | Montross | |
| 2002/0038744 | A1 | * | 4/2002 | Sukoff | 190/101 |
| 2004/0101664 | A1 | | 5/2004 | Puttkammer | |
| 2004/0164564 | A1 | * | 8/2004 | Redburn et al. | 292/307 R |
| 2004/0206431 | A1 | | 10/2004 | Metzig et al. | |
| 2005/0204515 | A1 | | 9/2005 | Hewes | |
| 2006/0225332 | A1 | * | 10/2006 | Zenisek | 40/638 |
| 2007/0221461 | A1 | * | 9/2007 | Carmona | 190/101 |

FOREIGN PATENT DOCUMENTS

| | | | |
|---|---|---|---|
| DE | 3340692 | A1 | 5/1985 |
| EP | 1026095 | A2 | 8/2000 |
| EP | 1028065 | A1 | 8/2000 |
| EP | 1037191 | A2 | 9/2000 |
| EP | 1347429 | A1 | 3/2002 |
| EP | 1347429 | A1 | 9/2003 |
| GB | 2150108 | A | 11/1984 |
| GB | 2150108 | A | 6/1985 |
| GB | 2403207 | A | 6/2003 |
| GB | 2388812 | A | 11/2003 |
| GB | 2415678 | A | 6/2004 |
| NZ | 514919 | A | 11/2003 |
| RU | 1795627 | A1 | 9/1996 |
| RU | 2225644 | C2 | 5/2002 |
| WO | 8802903 | A1 | 4/1988 |
| WO | 9312513 | A1 | 6/1993 |
| WO | 9701495 | A1 | 1/1997 |
| WO | 02070368 | A2 | 9/2002 |
| WO | 2006096908 | A1 | 9/2006 |
| WO | 2007041798 | A1 | 4/2007 |

OTHER PUBLICATIONS

International-Type Search Report of Australian Application No. 2005/905670 filed Oct. 13, 2005.

International Search Report of Counterpart Application No. PCT/AU2006/001510 filed Oct. 12, 2006.

Written Opinion of Counterpart Application No. PCT/AU2006/001510 filed Oct. 12, 2006.

International Search Report dated Oct. 8, 2008 for corresponding International Application No. PCT/AU2008/000885, filed Jun. 19, 2008.

Written Opinion dated Oct. 8, 2008 for corresponding International Application No. PCT/AU2008/000885, filed Jun. 19, 2008.

Office Action received from the United States Patent and Trademark Office dated Feb. 17, 2011 for corresponding U.S. Appl. No. 12/089,810.

Final Office Action received from the United States Patent and Trademark Office dates Aug. 1, 2011 for corresponding U.S. Appl. No. 12/089,810.

* cited by examiner

SECURITY SYSTEM FOR ARTICLES IN TRANSIT

CROSS-REFERENCE TO RELATED APPLICATIONS

This Application is a Section 371 National Stage Application of International Application No. PCT/AU/2008/000885, filed Jun. 19, 2008 and published as WO 2008/154686 A1 on Dec. 24, 2008, in English.

FIELD OF THE INVENTION

The present invention relates to a security system to provide evidence of tampering. In particular, although not exclusively, the invention may also relate to a tamper evidencing band for encircling an article. Thus, the security system of the present invention may be used to secure passenger baggage so that a passenger may be provided with evidence as to whether or not their baggage has been tampered with after it leaves the check-in counter. Additionally, the invention may have also have application to other items in transit such as postal or freighted goods and secure document transfer. The invention also relates to a strip for tamper evidencing, a tamper evidencing device, a device for securing an article, a method of protecting a luggage item, and a buckle.

BACKGROUND OF THE INVENTION

A tamper evidencing device is disclosed in our earlier international patent application published under number WO 2007/041798. The contents of this earlier application are incorporated herein by reference. The design comprises a strip of fabric with a buckle or loop at one end, with the free end able to be inserted through the loop or buckle to tighten the strip around the article to be protected. The free end has an adhesive panel which may be adhered onto another portion of the strip. Its removal or attempted removal is evidenced by the strip. Also, the buckle or loop was able to be released from the strip and the strip bore evidence that this had occurred. The design of this tamper evidencing device suffered from a number of disadvantages.

The old design was made from TYVEK® which was reinforced at each of its edges by a sewn heavy gauge nylon thread. If either thread failed when loaded, the strip would likely fail and snap. Also, if the strip was exposed to weight or a tearing force in any other area not covered by the nylon threads (e.g. the centre of the strip), this would cause localised tearing and material failure. This affected the reliability, security and appearance of the device.

The old design also relied heavily upon intricate sewing details and thus was inefficient to produce and resulted in high defect rates.

The old design had numerous longitudinal slots to receive cross bands which, when subjected to stress, caused the TYVEK® fabric surrounding the holes to tear and distort, weakening the material and providing potentially false indications of tampering.

The old design was made to encircle luggage and provide tamper indication of someone fully accessing the luggage. There was no provision to extend tamper indication to zipped pockets and compartments or other lockable areas on freight/luggage articles.

In the old design, the adhesive panel bonded to TYVEK® only. The resulting bond was excellent in peel strength as intended with the result that it would 'peel' one layer of TYVEK® from another when an attempt was made to remove the adhesive panel. However, due to the multiple layer/random grain nature of the TYVEK® fabric, it delaminated unintentionally during use when subject to any substantial 'pulling' force (as might be expected from baggage handlers). Consequently, it was classed as having poor 'shear' strength in use which failed when subjected to high loads.

The buckle release system involved the TYVEK® strip wrapped around a plastic buckle component and then sewn onto itself to seal the plastic buckle component to the TYVEK® strip. The TYVEK® strip would detach along a perforated line, tearing when subjected to a pulling force. However, testing produced inconsistent results.

It is an object of the present invention to provide: a security system; tamper evidencing device; elongate strip for a tamper evidencing device; or a buckle which addresses at least one of the abovementioned disadvantages. Another object of the present invention is to provide a buckle for guiding an elongate strip about an article. An alternative object of the invention is to provide the public with the useful choice over known products.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

The term 'transit article' is used to encompass any article in transit and may include luggage, freight or postal articles, documents etc.

In accordance with a first aspect of the present invention there is provided a strip for tamper evidencing, the strip comprising:

a first layer;

one or more reinforcing layers bonded to at least one side of the first layer; and adhesive means provided on a first portion of the strip to selectively adhere the first portion of the strip onto the first layer of a second portion of the strip, wherein the first layer is such that removal or attempted removal of the first portion of the strip from the second portion of the strip will be evidenced by the first layer.

The first layer is preferably a relatively weak material (certainly weaker than the reinforcing layer), such that when the first portion is removed, the material tears, delaminates or otherwise provides visible evidence of tampering. The first layer could comprise a plurality of layers or substrates which separate in an irregular or predetermined manner to reveal evidence of tampering. For this reason, the adhesive means may provide a stronger bond between the first portion and the first layer of the second portion than the cohesion between the fibres or other components of the first layer. The first layer may be comprised of non-woven fibres made from a plastics material and bonded by heat and pressure, such as a strip of TYVEK® protective material made by Dupont. Additionally, the strip may be formed to enhance the likelihood of a tear on attempted separation. This may be achieved by forming slits or lines of weakness in the strip such as chevron shaped slits.

The adhesive means may comprise a layer of adhesive applied to the first layer at the first portion. A removable release backing may be provided. Alternatively, the adhesive means may be impregnated into the strip e.g. into the first layer such that it is activated by heat.

The reinforcing layer(s) may extend the whole length of the first layer. Preferably, the first layer is reinforced by two reinforcing layers. The arrangement of these layers is such that a major surface area of the first layer will still be exposed to attach to the first portion anywhere along the remainder of the strip. This enables the strip to be adjustable in length. A first of the reinforcing layers may comprise a material of high tensile strength, such as fibreglass filaments. Preferably, these filaments extend longitudinally of the strip and may be spaced transversely. A second reinforcing layer comprises a sheet of any plastics material. Preferably, the plastics sheet is bonded to the first layer by heat or adhesive and encapsulates the high tensile strength material therebetween. The plastics sheet is suitably tear resistant. Furthermore, the plastics sheet may be transparent so that any printing applied to the first layer is still visible through the plastics sheet. Preferably, the plastics sheet is bonded to the first layer such that a major surface area of at least one side of the first layer is exposed substantially along the length of the strip. The plastics strip might also form the sole reinforcing layer.

The strip may be manufactured and supplied as continuous lengths e.g. on a roll. The strip may be cut to the required length in situ to form the tamper evidencing device in situ. Alternatively, the strip with may be cut to the required length before other manufacturing operations.

The preferred design of the strip is that the plastic sheet has a starting width which exceeds the width of the first layer. This enables the longitudinal edges of the plastics sheet to fold over the edges of the first layer to protect the edges of the first layer.

Preferably, the first layer has non-straight longitudinal edges. For example, both longitudinal edges may be defined in a “saw tooth” or castellated shape. Other possible shapes include sinuous shapes such as sinusoidal. Thus, when the longitudinal edges of the plastic sheet are folded over, the plastic sheet becomes bonded to itself at regular intervals along the longitudinal edge, depending on the shape of the longitudinal edges of the first layer.

Where the strip is employed in a tamper evidencing device, a proximal end of the strip may be provided with a loop, with a distal portion of the strip insertable through the loop, with the adhesive means facilitating selective attachment of the first portion onto the second portion of the strip to encircle an article in a band whereby attempted removal of the attachment or the loop will be evidenced by the device. Preferably, the first portion of the strip is at or adjacent the distal end of the strip with attempted removal of the first portion from the second portion being evidenced by the first layer. The loop may comprise a buckle and removal or attempted removal of the buckle may be evidenced by the buckle.

In addition, the adhesive means may incorporate tamper evidencing film which leaves irreversible evidence on the first layer or the plastics sheet which comprises the second reinforcing layer, of attempted removal of the first portion and/or irreversible evidence of attempted removal of the tamper evidencing film.

In accordance with a second aspect of the present invention there is provided a strip for tamper evidencing including:

a first layer of relatively weak material, the first layer having first and second sides;

a first portion of reinforcing material bonded onto at least a portion of the first side of the first layer; and a second portion of reinforcing material bonded onto at least a portion of the second side of the first layer;

wherein the first and second portions are directly bonded to each other at a plurality of locations spaced along the length of the strip.

The plurality of locations may be continuous or may be discrete. In other words, the first and second portions may be bonded directly to each other continuously along the length of the strip. In a more preferred form of the invention, the first and second portions are bonded to each other at discrete locations along the length of the strip. This may be facilitated by recesses or apertures spaced along the length of the first layer. For example, the ‘saw tooth’ or castellated shape in the first layer as described in connection with the first aspect of the invention may facilitate this. The purpose of this feature of the invention is to provide reinforcing material on both sides of the strip with sufficient adhesive contact between the reinforcing material on both sides so as to allow load bearing while preserving the tamper evidencing feature of the relatively weak first layer.

The first portion of the reinforcing material and the second portion of the reinforcing material may be formed in a single piece of reinforcing material which is folded over to bond to both sides of the first layer. Preferably, the first portion of reinforcing material covers the whole of the first side of the first layer. The second portion of reinforcing material may comprise two folded over side edges of the single piece of reinforcing material. Alternatively, the first and second portions of reinforcing material may comprise separate layers.

The strip for tamper evidencing may be a continuous strip which is formed into a roll. The strip may be cut to predetermined lengths then incorporated into discrete tamper evident devices. In an alternative form of the invention, the roll may be cut in situ to selected lengths to suit the transit articles and applied to the transit articles in situ. There may be a machine which facilitates this operation. The machine may apply the adhesive to enable the ends of the cut strip to adhere to each other.

The first layer and the reinforcing material and the strip so formed may have any of the features described above in connection with the first aspect of the invention.

In accordance with a third aspect of the invention there is provided a strip for tamper evidencing, the strip comprising:

a first layer; and one or more reinforcing layers bonded to at least one side of the first layer;

wherein the first layer is a relatively weak material such that anything adhered to it and subsequently removed is evidenced by the first layer itself.

Preferably the bonding between the one or more reinforcing layers and the first layer is such that separation or attempted separation will be evidenced by the first layer.

The elongate strip may be formed as a continuous strip on a roll. The strip may be cut in situ and applied to the transit articles in situ. Accordingly, the strip may be cut into various lengths as required by the dimensions of the transit articles. A piece of strip cut to length may be formed in a band around an article, with ends overlapping and bonded to each other, wherein removal or attempted removal will be evidenced by the first layer. The process of cutting in situ and applying the adhesive may be carried out by an automated binding machine.

The strip described above in accordance with a third aspect of the invention may have any of the attributes described in connection with the strip of the first and second aspects of the invention.

In accordance with a fourth aspect of the present invention there is provided a security system comprising:

a tamper evidencing device for protecting an article, wherein breach of the device in use is evidenced by the device itself, the tamper evidencing device bearing a unique identifier wherein removal or attempted removal of the unique identifier bears evidence of tampering; and a receipt portion for retention by a person responsible for the article, wherein the receipt portion also bears a unique identifier corresponding to the unique identifier of the tamper evidencing device.

Thus, while the tamper evidencing device will provide evidence of breach of that device, it is possible that the device could be completely removed and replaced by another such device. The security system of the present invention foresees that possibility by providing a receipt portion retained by the person responsible to ensure that the tamper evidencing device has not been replaced.

The receipt portion may be discrete from the tamper evidencing device. For example, the security system may come in a kit. On the other hand, the receipt portion may be provided as a detachable portion from the tamper evidencing device. In a preferred form of the invention, the tamper evidencing device is a band for encircling the article. The receipt portion may be joined to the band e.g. at distal end of the band with a line of perforations, facilitating its removal. The receipt portion may be non-reversibly detachable from the band.

The receipt portion may be adhesive backed for securement to any appropriate surface e.g. the person responsible's documentation. For example, the receipt portion may be attached to the boarding pass or passport or shipping papers. Furthermore, tamper evidencing material may be incorporated into the receipt portion to indicate removal or attempted removal of the receipt portion from the document concerned. Where this receipt portion is applied by an official, this serves to preclude the possibility that the person responsible may remove the receipt portion and substitute another receipt portion corresponding to another item, or an item which does not exist, e.g. to fraudulently claim insurance.

The unique identifier may be borne on a portion of tamper evidencing material applied to the device.

Where the security device comprises a band, the tamper evidencing material on the band may be adjacent to the tamper evidencing material on the receipt portion. This may initially comprise a single piece of tamper evidencing material which is divided on detachment of the receipt portion.

Furthermore, the receipt portion may be provided with one or more zip tab securing portions, each of which is separable from the receipt portion (and each other), for securement to zip tabs or locking points of the article, whereby removal or attempted removal is evidenced by the zip tab securing portions or the absence thereof. The zip tab securing portions may also comprise tamper evidencing material.

The tamper evidencing material is suitably adhesive backed and removal or attempted removal from the surface to which it is applied bears evidence of this fact. The tamper evidencing material with the unique identifier may be applied during manufacture.

The tamper evidencing material may be in the form of a film having a substrate layer (preferably transparent) to which a visible layer is bonded, with an adhesive layer provided on the visible layer. A release backing may be provided on selected portions of the tamper evidencing material.

Upon removal or attempted removal of the tamper evidencing film, the visible layer disperses with some portions remaining on the desired surface and some portions remaining on the substrate layer. To achieve this effect, the visible layer may be unevenly bonded to the substrate layer. Suitably, the film cannot be reunited after removal or attempted removal. The visible layer may disperse in a manner which leaves indicia or words on either the substrate layer or the desired surface e.g. the words VOID or TAMPERED may appear on either the substrate layer or the desired surface once the tamper evidencing film has been tampered with.

In accordance with a fifth aspect of the present invention there is provided a security system comprising:

a tamper evidencing device for protecting an article, wherein breach of the device in use will be evidenced by the device itself, the tamper evidencing device bearing a unique identifier; and a receipt portion bearing a unique identifier corresponding to the unique identifier of the device, the receipt portion being selectively attachable to a document or item retained by a person responsible for the article, the receipt portion incorporating tamper evident material which bears evidence of removal or attempted removal of the receipt portion from the document or item.

Having the tamper evidencing device and a receipt portion prevents complete removal of the device and substitution by another device, because the identifier on the device will no longer correspond with the identifier on the receipt portion retained by the person responsible. Furthermore, the receipt portion incorporates tamper evident material. If this is applied to the person responsible's document or other item by an official then this mitigates against them substituting an alternative receipt portion and fraudulently claiming ownership of another article which does not exist. The prevention of this possibility strengthens the person responsible's claim to the article where the article goes missing or the article is otherwise tampered with.

Any of the features described above in connection with the first to fourth aspects of the invention may be applied to this aspect of the invention.

In accordance with a sixth aspect of the present invention there is provided a tamper evidencing device for an article in transit wherein the tamper evidencing device includes an identifier in a trackable format, whereby removal or attempted removal of the tamper evidencing device from the article or removal or attempted removal of the identifier from the tamper evidencing device, is evidenced by the tamper evidencing device itself.

The identifier in a trackable format may comprise a bar coded and/or a radio frequency identification device (RFID). A plurality of identifiers in a trackable format may be incorporated into the same tamper evidencing device. This may allow for operation of a secondary tracking system in the case of failure of the primary tracking system. This may also allow for the transition from one system to another, or cross verification of the data of the two identifiers that are read simultaneously.

The tamper evidencing device may be formed as a strip of tamper evidencing material as described in connection with any of the foregoing aspects of the invention. The tamper evidencing device may be comprised of the strip with the loop or buckle as described above in connection with the first aspect of the invention.

The tamper evidencing device may include a tracking portion which includes the identifier in a trackable format. The tracking portion may be separable from the article. Preferably, the tracking portion is non-detachably removable from the article. The tracking portion may be mounted onto the buckle. The tracking portion may be comprised of the same material as the buckle or alternatively another material that is affixed to the buckle. The tracking portion may also have adhesive that may enable the tracking portion together with the buckle to be affixed to an article. The adhesive bond between the article and the tracking portion may be stronger than the attachment that attaches the tracking portion to the buckle, so that removal of the buckle from the article after it has been attached shall allow the tracking portion to remain with the article to allow continued tracking of the article.

In another preferred form of the invention, the tracking portion may be otherwise separable from the remainder of the tamper evidencing device to remain with the article to allow continued tracking of the article.

In accordance with a seventh aspect of the present invention there is provided a device for securing an article to be transported, the device including a tracking portion connected to and separable from the remainder of the device by a separable connection, the tracking portion being provided with an adhesive portion to secure the tracking portion to the article, wherein the bond of the adhesive portion is stronger than the separable connection.

The separable connection is suitably such that the tracking portion is selectively removable from the remainder of the device e.g. on the application of a sufficient force. The separable connection may be in the form of frangible connections between the tracking portion and the remainder of the device. For example, these frangible connections may be in the form of perforations. Alternatively, the separable connection may be an adhesive bond.

In a most preferred form of the invention, the tracking portion may be provided on a buckle which forms part of the securing device. For example, such a securing device may comprise a buckle and a strip, configured to extend around the article in a band. Any of the features described in foregoing aspects may be applied to the present aspect.

In accordance with a eighth aspect of the present invention there is provided a security system comprising:

a tamper evidencing device for encircling an article, wherein breach of the device in use is evidenced by the device itself, the device including a unique identifier; and one or more zip tab securing portions for securing zip tabs or luggage locking points, wherein removal or attempted removal of the zip tab securing portions is evidenced by the zip tab securing portions or the tamper evidencing device, the zip tab securing portions also bearing a unique identifier corresponding to the unique identifier of the tamper evidencing device.

The zip tab securing portions may be a series of strips or cable ties. Each strip or cable tie is preferably insertable through openings in adjacent zip tabs, with opposite end portions of the strip or cable tie being securable to each other. The zip tab securing portions may be tamper evident. Each strip may be comprised of tamper evident film. Each cable tie may incorporate tamper evident film or other tamper evident features. In the case of the strip, when the tamper evident film is bonded to itself, it leaves evidence of separation or attempted separation of the secured end portions of the strip. In the case of the cable tie, when the tamper evident film is bonded to the cable tie, it leaves evidence of separation or attempted separation of the film from the cable tie. The tamper evident film may have any of the features described above in connection with the fourth aspect of the invention.

The zip tab securing portions may be provided as discrete or separate portions from the tamper evidencing device. Alternatively, the zip tab securing portions may be provided as separable from the tamper evidencing device. In a most preferred form of the invention where the tamper evidencing device is a band for encircling the article and a receipt portion is provided which is separable from the band, the zip tab securing portions may be provided as part of the receipt portion.

Furthermore, the tamper evidencing device may be provided with apertures or slits for the receipt of zip tabs or zip tab securing portions. The apertures or slits may be provided as a series of spaced slits along one or both longitudinal edges of the band. One of the zip tabs may be passed through one of the apertures or slits, prior to attaching the zip tab securing portions to the adjacent zip tabs. Alternatively, the zip tab securing portion may be passed through the holes in the zip tabs and also through one of the apertures or slits in the tamper evidencing device and then the ends sealed together. Having zip tabs secured to an aperture on the tamper evidencing device has the effect of isolating the movement of the zip sliders by affixing them to a stationary point.

Zip sliders have a function that ordinarily seals and rejoins the two separate portions of a zip chain when they have free movement. This can be achieved even when two adjacent zip tabs are secured together with a conventional locking mechanism. Luggage hackers are known to separate the two portions of the zip chain to obtain access to the luggage and then rejoin the separated portions by moving the adjacent zip tabs along the zip chain, even when the zip tabs are locked together. Affixing the zip tabs to the tamper evidencing device in this manner prevents the concealment of a breach in the zip chain by preventing the movement of the zip sliders. In the event the sliders are moved to rejoin a zip chain (providing zip tabs are isolated as described), any movement will be evidenced by damage to either the device or the zip tab securing portion.

Any of the features described above in connection with the foregoing aspects may be applied to this aspect of the invention.

In accordance with a ninth aspect of the present invention, there is provided a method of protecting a luggage item having a zip closure with a pair of zip tabs, each of which has holes therethrough, the method comprising:

encircling the luggage item with the tamper evidencing device as per the eighth aspect above, wherein the tamper evidencing device includes one or more apertures; inserting one of the zip tab securing portions through the holes of both the zip tabs to form a zip tab coupling which is anchored to the tamper evidencing device by either one of the zip tabs or the zip tab securing portion having been inserted through one of the apertures.

Thus there are two possible methods of anchoring the zip tabs as follows:

1. inserting only one of the adjacent zip tabs through one of the apertures; and securing the securing the zip tab securing portion through the holes of both zip tabs; or 2. inserting the zip tab securing portion through the holes of the two adjacent zip tabs; and further inserting the zip tab securing portion through one of the apertures.

Any of the features described above in connection with the foregoing aspects may be applied to this aspect of the invention.

In accordance with a tenth aspect of the present invention there is provided a buckle for a tamper evidencing device, the buckle being attachable to an elongate strip and defining a loop or guide for receiving a portion of the strip, such that the strip may be looped in a band around an article, the buckle including a non-reversible release to release the band, the use of which is evidenced by the buckle.

The release function allows the end user to conveniently remove the device in a permanent manner without the need to use cutting implements, which are often unavailable due to security restrictions in a number of travel environments and public facilities.

The buckle may include opposite side portions which receive and secure the strip therebetween. For instance, the opposite side portions may define a housing through which the strip is inserted. In another form of the invention, the buckle may comprise two separate side portions which are overlaid to clasp the strip therebetween. In a most preferred form of the invention, there are two side portions which are hingedly connected to fold over one another to clasp the strip therebetween.

A securement means to attach the buckle to the strip may be provided. The buckle may be secured to the elongate strip by heat sealing the buckle onto the strip. Alternatively, the opposite side portions may clip together one time only such that after separation, they cannot be reunited.

Alternatively, the buckle may be affixed to the strip by adhesive. Alternatively, the buckle may be attached to the strip by means of a loop portion provided by the strip, the attachment means being formed by the strip being attached to itself, forming the loop and the buckle being contained within that loop portion.

The securement means may include projecting knobs and cooperating recesses on the opposite side portions to receive aligned apertures in the strip.

One end of the strip may be secured to the buckle by the securement means. The other end of the strip may be fed through the loop or guide and around the article and then secured onto itself such that removal or attempted removal will be evidenced by the strip itself.

Upon operation of the release, the buckle may be divided in two portions which are non-reversibly separable from each other. The first includes a securement portion and the second includes a loop defining portion which includes said loop or guide.

The loop defining portion of the buckle may be formed as a part of one of the side portions. Preferably, the loop defining portion has the loop or guide at one end and a release tab at the other end. Preferably, the loop defining portion is separable from the remainder of the buckle by breaking frangible connections disposed between the loop defining portion and the remainder of that side portion. The frangible connections may be such that they are more easily broken from the end closest to the tab.

Preferably, the remainder of that side portion not forming part of the loop defining portion forms part of the securement portion together with the other side portion. When the buckle is attached to the strip, these parts are permanently secured to the strip e.g. by heat fusing. Thus, when the release tab of the loop defining portion is pulled, this separates the loop defining portion from the remainder of the strip, thereby releasing the strip.

The buckle may include a tracking portion. The tracking portion may include any of the features described below in connection with the following aspects of the invention. Any of the features described above in connection with the foregoing aspects of the invention may be applied to this aspect.

In accordance with a eleventh aspect of the present invention there is provided a tamper evidencing device for protecting an article, the device comprising:

an elongate strip;

a buckle portion secured to the elongate strip, the buckle portion defining a loop or guide wherein a distal portion of the elongate strip remote from the buckle portion is insertable through the loop or guide; and attachment means to selectively attach the distal portion onto another portion of the strip to secure the strip in a band around the article, wherein attempted removal of the attachment will be evidenced by the device, the buckle incorporating an non-reversible release to release the band, the use of which is evidenced by the buckle portion.

Any of the features described above in connection with the foregoing aspects may be applied to this aspect of the invention. The tamper evidencing device may incorporate a tracking device or an identifier in a trackable format. This may include any of the features described in accordance with the other aspects of the invention.

In accordance with a twelfth aspect of the invention, there is provided a buckle for guiding an elongate strip about an article, the buckle being attachable to the strip and defining:

a first guide or loop for insertion of a free end of the strip such that the strip may be looped in a first band around an article and guided to extend therebeyond in a transverse direction to said first band.

The first guide or loop may be angled to the direction of the first band. The first guide or loop may be in part defined by a first bar or aperture forming part of the buckle which defines a feature through which the strip may be fed. This feature may extend at approximately 45 degrees (or any other suitable degree) to direct the strip in a direction required to encircle the article to form a second band that extends in a transverse direction to the said first band. The buckle may include a second guide or loop to receive the free end of the strip such that the strip may be tightened and secured to complete the formation of the said second and first bands. The second guide or loop preferably extends at a suitable angle to the first guide to facilitate the transverse arrangement of the first and second bands, preferably at approximately 45 degrees.

The buckle may include opposite side portions which receive the strip therebetween. For instance, the opposite side portions may define a housing through which the strip is inserted. In another form of the invention, the buckle may comprise two separate side portions which are overlaid to clasp the strip therebetween. In a most preferred form of the invention, there are two side portions which are hingedly connected to fold over one another to clasp the strip therebetween.

A securement means to attach the buckle to the strip may be provided. The buckle may be secured to the elongate strip by heat sealing the buckle onto the strip. Alternatively, the opposite side portions may clip together. In a single use or tamper-evident device, the side portions may clip together one time only such that after separation, they cannot be reunited. The securement means may include projecting knobs and cooperating recesses on the opposite side portions to receive aligned apertures in the strip.

Alternatively, the buckle may be affixed to the strip by adhesive. Alternatively, the buckle may be attached to the strip by means of a loop portion provided by the strip, the attachment means being formed by the strip being attached to itself, forming the loop and the buckle being contained within that loop portion.

One end of the strip may be secured to the buckle by the securement means. The other end of the strip may be fed through the first and second guides or loops and around the article and then secured onto itself. This allows the strap to be applied to items of different dimensions, as the size of the first and second band are defined by the user before the device is secured to itself. In a tamper evident device, the securement of the strip onto itself may be such that removal or attempted removal will be evidence by the strip itself.

The buckle may include a non-reversible release to release the band, the use of which is evidenced by the buckle, rendering the buckle a tamper evident device. The release function allows the end user to conveniently remove the device in a permanent manner without the need to use cutting implements, which are often unavailable due to security restrictions in a number of travel environments and public facilities.

The buckle may be also be defined in two portions which on operation of the release are non-reversibly separated from each other. The first includes a securement portion and the second includes a loop defining portion which defines said first and second guides or loops.

The loop defining portion may be formed as a part of one of the side portions. Preferably, the loop defining portion defines the first and second guides or loops at one end and a release tab at the other end, the release tab forming part of the non-reversible release. Preferably, the loop defining portion is separable from the remainder of the buckle by breaking frangible connections disposed between the loop defining portion and the remainder of that side portion. The frangible connections may be such that they are more easily broken from the end closest to the tab.

Preferably, the remainder of that side portion not forming part of the loop defining portion, forms part of the securement portion together with the other side portion. When the buckle is attached to the strip, these parts are permanently secured to the strip e.g. by heat fusing. When the release tab of the loop defining portion is pulled, the loop defining portion is released from the remainder of the buckle, thereby releasing the strip.

The buckle may include a tracking device to enable tracking of the article in transit. Where such a tracking device is incorporated with the buckle, the buckle may include a third tracking portion which is non-reversibly separable from the remainder of the buckle, the tracking portion having adhesive to secure the buckle to the article, such as a package, via the tracking portion. Preferably, the tracking device may be mounted onto or incorporated into the tracking portion to remain with the article even when the reminder of the buckle is removed from the article. In a preferred embodiment, the tracking portion is connected to the reminder of the buckle by frangible connections. The tracking portion may be non-reversibly separable from the securement portion. The tracking device may comprise a radio frequency identification device (RFID) or a global positioning system (GPS) tracking device.

Preferably, the adhesive bond between the article and the tracking portion is stronger than the frangible connections that connect the tracking portion to the remainder of the buckle. Therefore, removing the buckle will cause the separation of the tracking portion from the remainder of the buckle and the said tracking portion will remain with the article, allowing continued tracking of the article.

Alternatively, a separate tracking portion may be mounted onto the buckle. The tracking portion may be comprised of the same or another material as the buckle, e.g. a plastic plate or a flexible film, that is affixed to the buckle by adhesive or other suitable attachment means, e.g. heat sealing, the tracking portion also having adhesive on the face distal to the buckle that may be exposed upon the removal of a peelable layer to affix the tracking portion to an article. The adhesive bond between the article and the said tracking portion should be stronger than the attachment means that attaches the said tracking portion to the buckle, so that removal of the buckle from the article after it has been attached shall allow the tracking portion to remain with the article to allow continued tracking of the article.

In accordance with a thirteenth aspect of the present invention, there is provided a device for strapping an article including: an elongate strip and a buckle as per the twelfth aspect of the invention secured to the elongate strip. The strip may include any of the features described in connection with any of the foregoing aspects of the invention discussed above.

The device may have particular application to postal and freight packages and secure document transfer. In the case of shipping of valuable items, the device is especially useful to make substitution of alternative and inferior items detectable.

As used herein, the term "comprise" and variations of the term, such as "comprising", "comprises" and "comprised", are not intended to exclude other additives, components, integers or steps.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

It will be understood that where specific materials have been disclosed and defined in this specification, that the invention disclosed shall extend to all alternative combinations of other materials of equivalent or similar function which may be combined in the manner described to achieve the functions and effects described in this application.

It will be understood that where specific manufacturing processes have been disclosed and defined in this specification, that the invention disclosed shall extend to all as alternative combinations of other manufacturing methods of equivalent or similar function which may be combined in the manner described to achieve the functions and effects described in this application.

The invention consists in the foregoing and also envisages constructions of which the following gives an example.

BRIEF DESCRIPTION OF THE DRAWINGS

In order that the invention may be more fully understood, one embodiment will now be described by way of example with reference to the figures in which.

DETAILED DESCRIPTION OF THE EMBODIMENTS

Figures 4, 5:
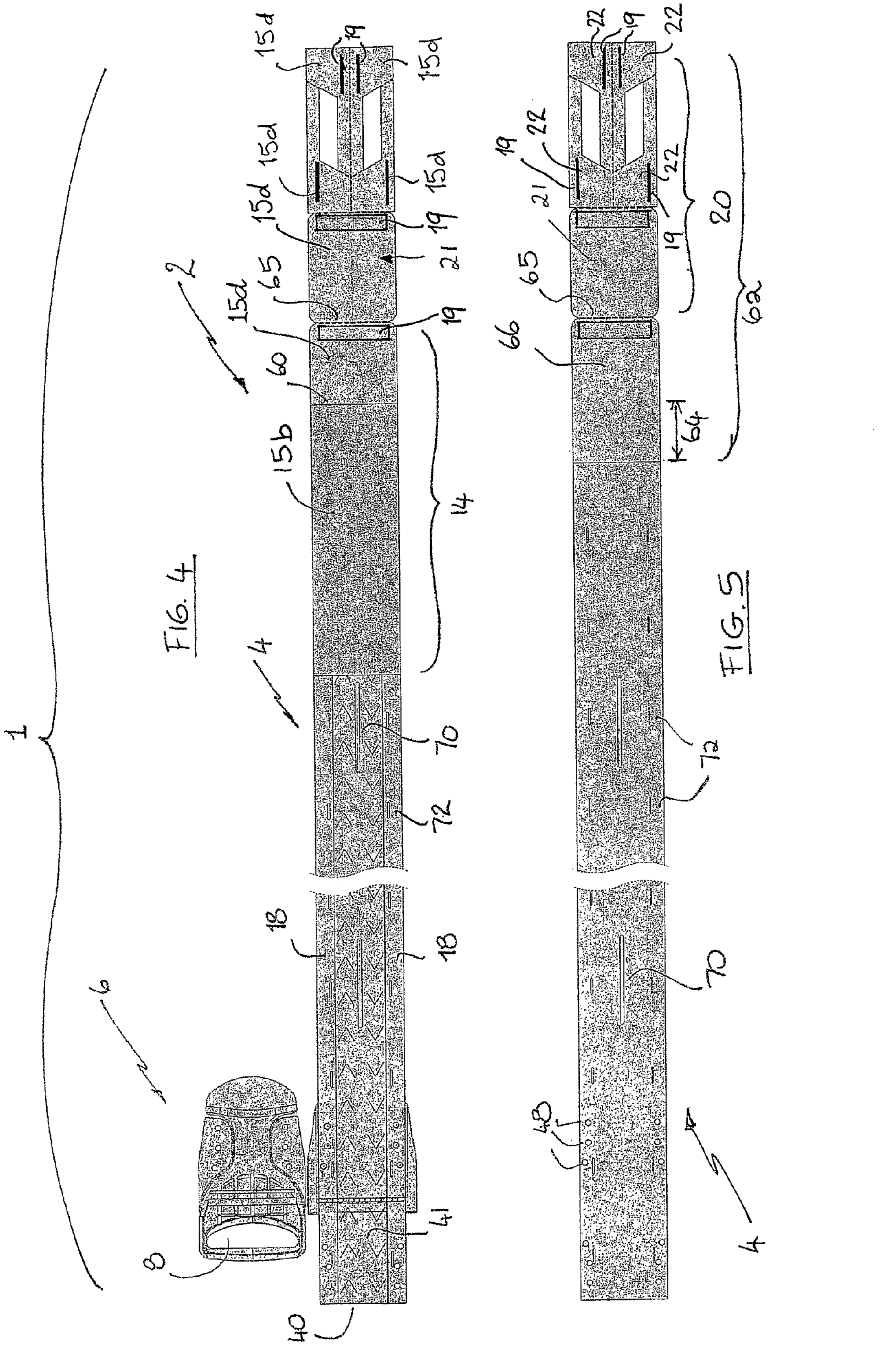
FIG. 4 is a plan view of the front side of a nearly completed tamper evidencing device according to a first preferred embodiment of the present invention.
FIG. 5 is a plan view of the rear side of the composite strip for the tamper evidencing device of FIG. 4.

FIGS. 1 to 5 illustrate the manufacturing process for a single-use security device 1 in the form of a luggage tie. As shown in FIG. 4, the nearly completed security device 1 includes a composite strip 4, the composition of which will be explained below. At one end of the strip 4, a buckle 6 may be secured to the strip 4, although in FIG. 4, this is shown in the open configuration, prior to being secured.

A receipt portion 20 is detachable from the composite strip 4, the purpose of which will be explained below. The receipt portion 20 includes receipt stub 21 and optional detachable zip-tab securing portions 22, the function of which will also be explained below. For clarity, the term composite strip 4 is used to describe the strip material in its ready-to-use state including the receipt portion 20. Once receipt portion 20 is removed, the remaining strip material is referred to as a tamper evidencing band 2, intended for encircling the transit article e.g. luggage. It can be seen from FIGS. 4 and 5 that the tamper evidencing band 2 and the receipt stub 21 include corresponding unique identifiers 19 so that the stub 21 can be matched to the luggage. If, upon receipt of the luggage at the end of the journey, the tamper evidencing band 2 around the luggage is intact and the corresponding identifiers 19 on the receipt stub 21 and the band 2 are a match then this will verify the authenticity of the luggage item and indicate the unlikelihood that the luggage has been tampered with. The unique identifiers 19 on the receipt stub and the band 2, also match identifiers 19 provided on the zip-tab securing portions 22. The identifiers 19 may comprise a unique serial number. The identifier may be in a trackable format such as a barcode, RFID or GPS.

Figure 10A:
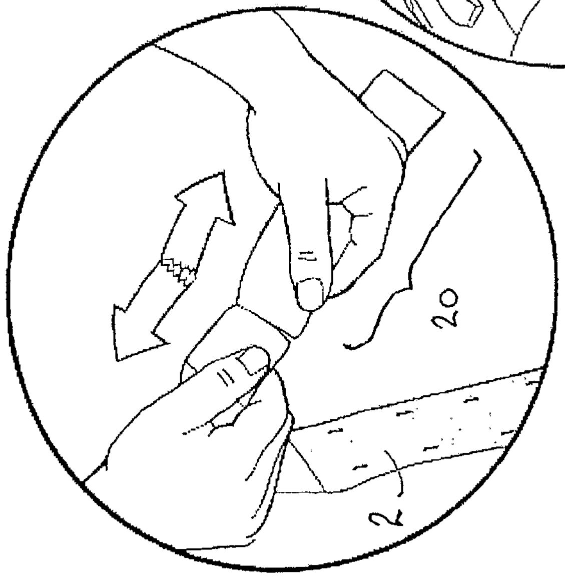
FIGS. 10A-10F illustrates the steps in securing the tamper evidencing device to a luggage item.
Figure 10B:
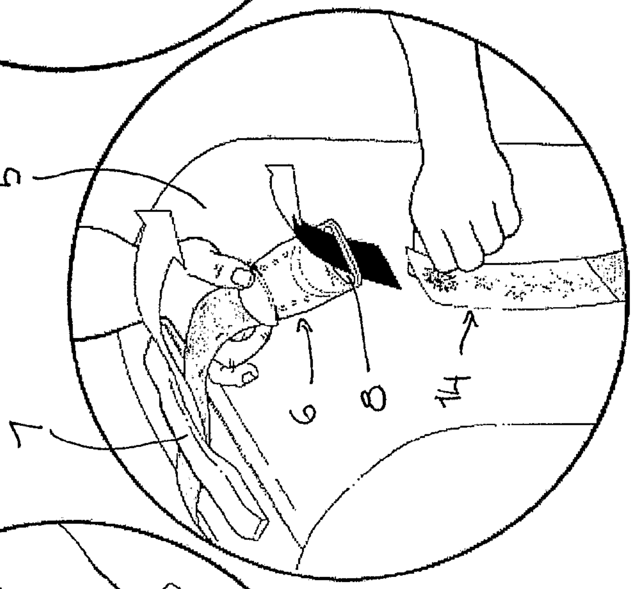
Figure 10C:
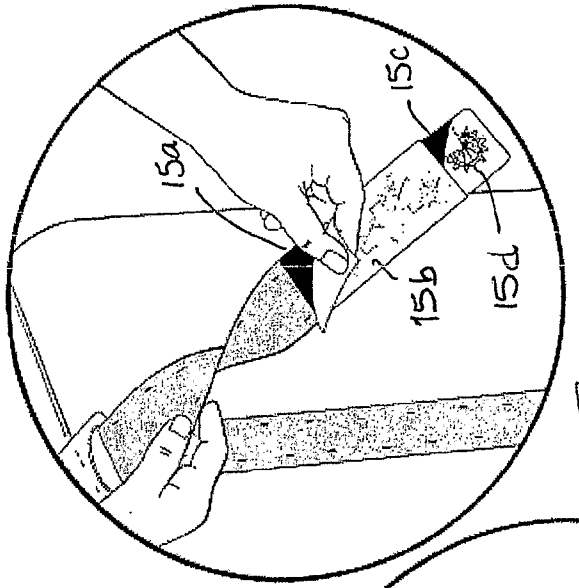
Figure 10D:
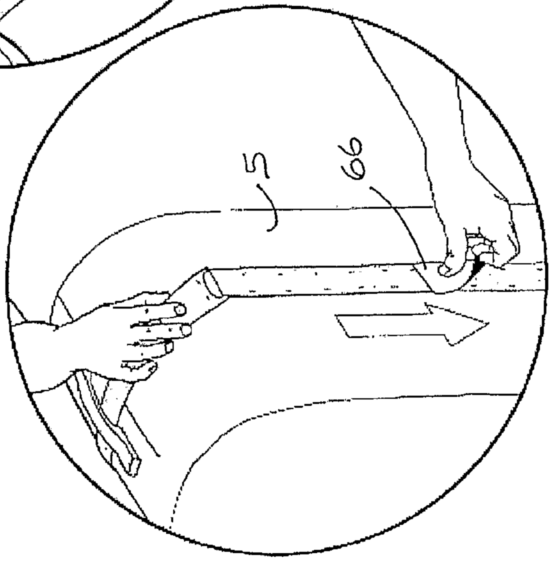
Figure 10E:
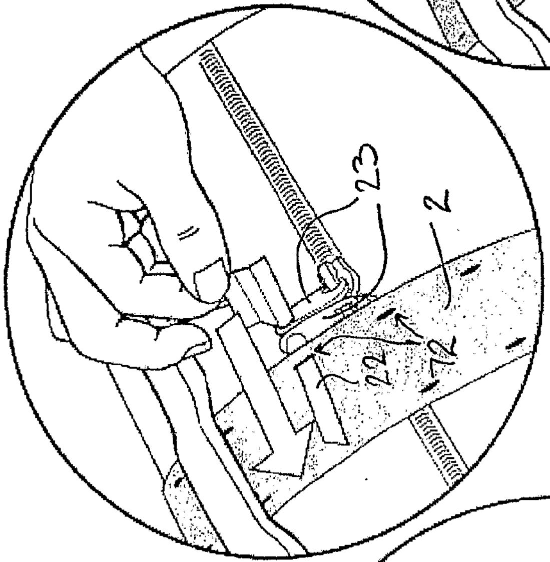

FIGS. 10A-10D illustrate the intended use of the security device 1. Once the receipt portion 20 is removed (FIG. 10A), the remaining portion of the security device is a tamper evidencing band 2 which may extend around an article to be protected such as luggage item 5 (FIG. 10B). Importantly, the band 2 is inserted through a fixed point on the article so that it cannot be slide off. The fixed point may include a luggage handle 7 (see FIG. 10B) or a cross threaded strap. The buckle 6 includes a loop 8 through which a distal portion 14 of the band 2 may be threaded (FIG. 10B). The band 2 is pulled taut around the article 5 to be protected, forming an encircling band. The band 2 is pulled back on itself. The distal portion 14 is provided with adhesive 15*a* on the front side (FIG. 10C), with a release backing 15*b*. This enables the band 2 to be secured back on itself by adhering the distal portion 14 onto another portion of the strip to secure the band 2 around the article 5 (FIG. 10D). As discussed further below, the design of the product is such that its removal or attempted removal will be evidence by the band 2.

In order to legitimately remove the band 2 from the article around which it extends, the buckle 6 incorporates a non-reversible release as will be explained below. This means that once released, the buckle cannot be put back together and re-used. This will in itself provide evidence of tampering.

Figure 1:
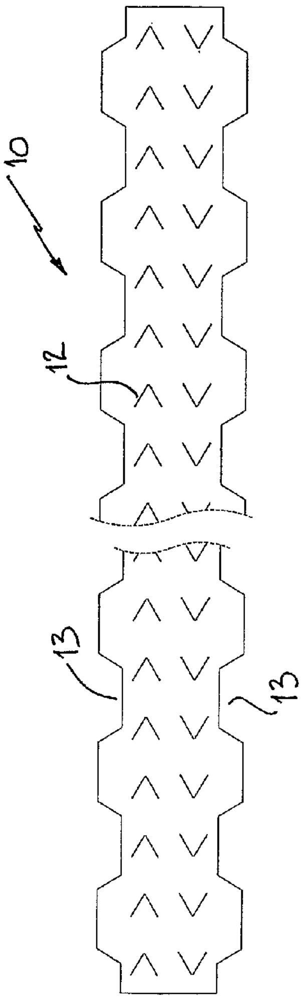
FIG. 1 is a plan view of a strip of TYVEK® employed in the tamper evidencing device according to a preferred embodiment of the invention.

Through the description of the manufacturing process below, the features of the tamper evidencing device will be understood. As shown in FIG. 1, the strip material used in the tamper evidencing device comprises a first layer comprising a strip of TYVEK® material 10, a proprietary material of Dupont. TYVEK® is made from very fine high-density polyethylene fibres which are formed by flash-spinning. The fibres are randomly distributed and non-directional and are bonded together by heat and pressure—without the use of binders, sizers or fillers. The strip of TYVEK® material is punched with chevron cuts 12. In use, when the distal portion 14 (see FIG. 4) is adhered by the contact of the adhesive 15*a* onto another portion of the strip, these chevron cuts 12, together with the high peel strength of the adhesive bond provide evidence of tampering if an attempt is made to separate the distal portion 14 from the other portion to which it is bonded. Any suitably weak material can be used as an alternative to TYVEK®.

As shown in FIG. 1, the strip 10 is shaped with a 'saw tooth' or castellated pattern along its longitudinal edges 13. This may be achieved by punching or cutting a number of strips side by side, but longitudinally offset.

Figure 2:
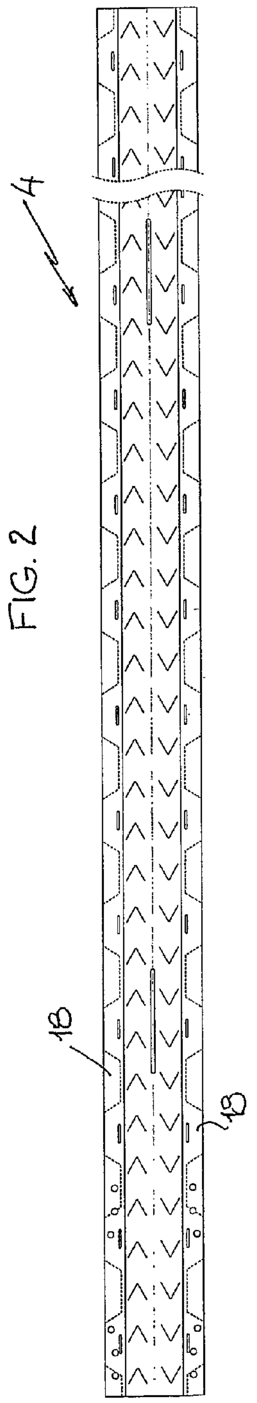
FIG. 2 is a plan view of the front side of a composite strip employed in the tamper evidencing device according to a first preferred embodiment of the present invention.
Figure 3:
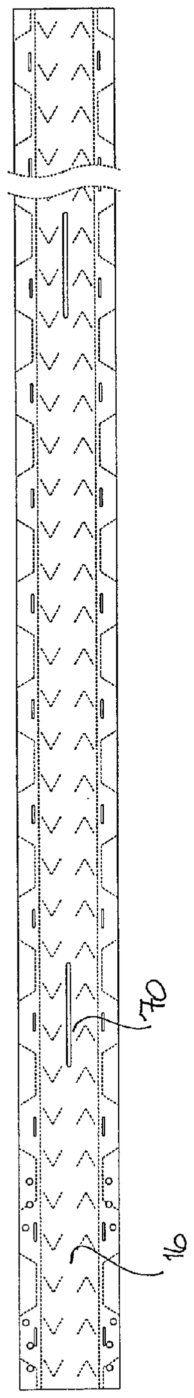
FIG. 3 is a plan view of the rear of the composite strip for the composite strip of FIG. 2.

To the rear of the strip 10 is affixed a reinforcing layer or layers of tear resistant plastic sheet 16 or other suitable film (not shown) with or without high tensile filaments. In the preferred embodiment, fibreglass filaments are used to reinforce the load bearing capacity of the strip 4. However, for applications which do not require higher weight loading capacity, reinforcement with high tensile filaments may not be required. If included, these filaments extend longitudinally of the strip 10. This plastic film 16 is transparent and wider than the strip 10. The resulting exposed longitudinal edges of the plastic film 16 on each side of the strip 10 are then folded over the edges of the strip 10 and affixed to its front surface, resulting in overlapped margins 18 extending approximately 1 cm from each edge in the composite strip 4 as shown in FIG. 2. See also FIG. 5B which schematically illustrates the various layers.

The resulting bond is thus a combination of the bond between firstly the TYVEK® material 10 and plastic film 16 and secondly plastic film 16 and plastic film 16. This second feature results from the sawtooth pattern of the longitudinal edges 13 whereby in the overlapped margins 18, 50% is plastic film bonded to TYVEK® and 50% is plastic film bonded to plastic film.

The first benefit of this new design is that the reinforced TYVEK® (or other suitably weak material) no longer fails prematurely through delamination at the point where the adhesive panel 15 is adhered to another portion of the strip, and no longer incurs premature material failure through excessive elongation caused by expected weight loads anywhere on the band such as those likely to be encountered during the baggage transportation and handling processes. Importantly, sufficient TYVEK® material is still present on the front face of the composite strip 4 to bond with the distal portion 14 to retain the tamper evidencing feature resulting from the strong peel strength) of the adhesive bond.

Additionally, this combination of materials also creates a bond between the adhesive 15*a* on the distal portion 14 with the plastic film 16 in the margins 18. This bond has a particularly high shear strength, resulting in an adhesive bond which has significantly greater load bearing capacity than our previous design disclosed in WO 2007/041798. In the preferred design, the resulting bond between the adhesive 15*a* and the front face of the band 2, including the TYVEK® and the plastic film margins 18, can now support over 80 kg of pulling force when the band 2 is sealed around an item. This result is achieved with a significantly reduced adhesive area.

A number of tamper evidencing features have been incorporated into the design.

Firstly, when the adhesive 15*a* is attached to the TYVEK® surface on the strip 4, it forms a bond that is stronger than the force required to irreversibly damage the surface of the TYVEK®. This effect is enhanced by the multi-directional chevrons 12 that are cut into the surface of the TYVEK® strip 10. Once the bond between the adhesive 15*a* and the TYVEK® has occurred, applying force to separate the adhesive from the TYVEK® will result in an irregular effect on the TYVEK®, which partially delaminates, tears and fragments under the force taken to remove the adhesive. Consequently, any attempt to remove this adhesive bond will leave clear indications of tampering.

This effect may also be achieved with any alternative material to the TYVEK® that is produced or configured in layers and where the bonds or composition between the layers of the material is weaker than the strength of the bond with the adhesive 15*a*.

The strip material comprising the TYVEK® material 10 and the reinforcing material 16 may be used on its own as a tamper evidencing strip, without the buckle 6. In this form of the invention, the strip material may be stored on a roll and cut to length as required. This may occur in situ so that the strip material may be cut to the required length to suit the size of the transit article such as luggage item 5. The strip material may then be applied in a band around the transit article 5. This process may be automated using a machine which cuts the strip material and applies appropriate 20 adhesive in situ to secure the ends in overlapping configuration.

Figure 5A:
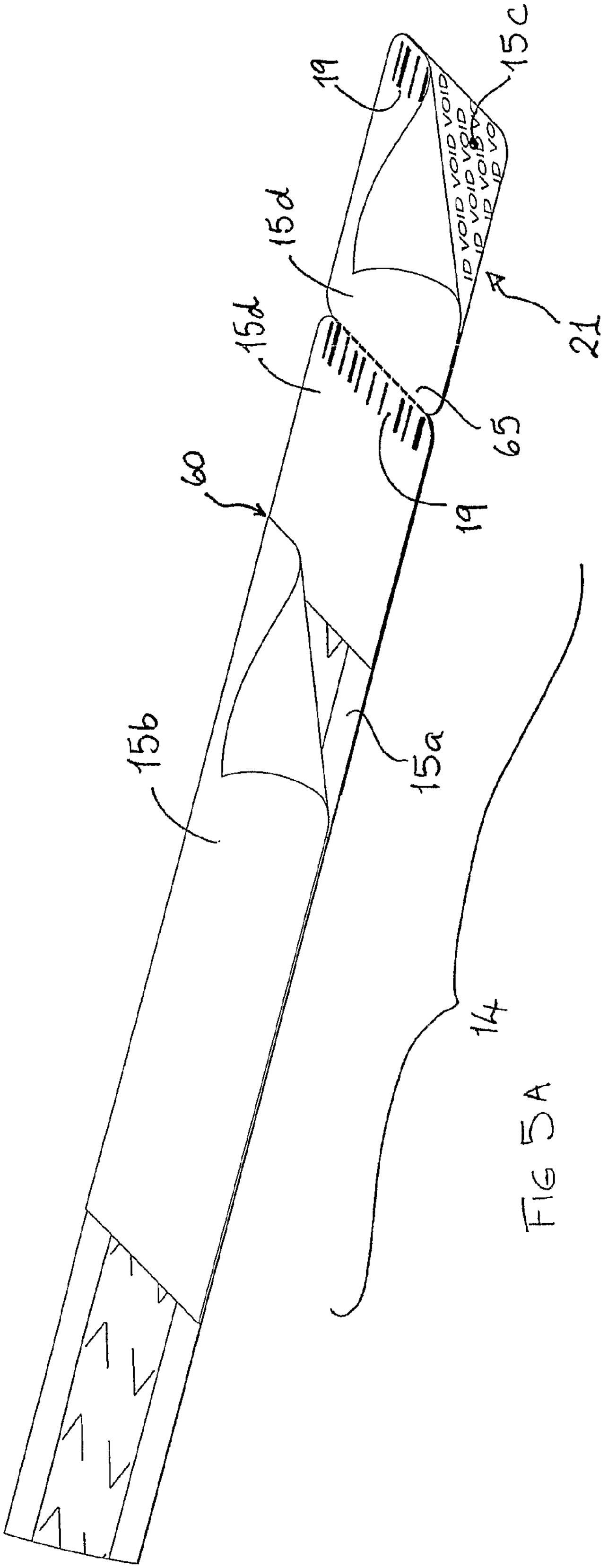
FIG. 5A is a schematic view showing the composition of the layers at the distal portion of the composite strip of FIG. 5.

FIG. 5A indicates the adhesive 15*a* at the distal portion 14 of the composite strip 4 (shown without optional zip tab securing portions 22). The TYVEK® material 10 and the reinforcing material 16 terminate at 60. The adhesive 15*a* also terminates at the end 60 of the TYVEK® material 10 and the reinforcing plastic film 16. Thus the adhesive 15*a* is adhered to the front side of the composite strip 4 as shown in FIG. 4 and FIG. 5A.

Adhered to the other side of the composite strip 4 is a length of tamper evident film 62 (see FIG. 5). This overlaps with the TYVEK® material 10 and the reinforcing material 16 on the opposite side to the adhesive 15*a* for only a small overlap portion 64. The section of tamper evidencing film 62 may be divided at perforation line 65 to define a receipt portion 20 which includes the receipt stub 21 and zip tab securing portions 22 (not shown in this figure—see FIGS. 4 and 5). FIG. 5A also shows the corresponding unique identifiers 19, in the form of bar-coding.

The tamper evidencing film 62 is made up of multiple layers (not shown) including a transparent substrate layer and a visible layer, with an adhesive layer 15*c* (see FIG. 5A) provided on the visible layer. A release backing 15*d* is provided to cover the exposed portions of the adhesive layer 15*c*. With the release backing 15*d* removed, the exposed portions of the adhesive layer 15*c* of the tamper evidencing film face in the same direction as the adhesive 15*a* (with its release backing 15*b* removed). The line of perforations 65 defining the receipt portion 20 and the perforations also defining the individual zip tab securing portions 22 may extend through both the tamper evident film 62 and the release backing 15*d*. Thus, when it is desired to separate the receipt portion 20 from the remainder of the tamper evidencing band 2, the corresponding portion of the release backing 15*d* may also be separated.

The adhesive 15*a* and the adhesive layer 15*c* may be different adhesives.

In use, the receipt portion 20 is first removed (FIG. 10A). Removing the receipt portion leaves a residual portion 66 of tamper evident film (see FIGS. 5 and 10D) as part of the distal portion 14. The distal portion 14 is then to be threaded through the loop 8 of the buckle 6 and the encircling band tightened around the article (FIG. 10B). The release backings 15*b*, 15*d* are then removed so that the adhesive 15*a* and the adhesive 15*c* of the tamper evident film 62 may be secured back onto the band 2 (FIGS. 10C, 10D).

After securement, the residual portion 66 of the tamper evident film 62 cannot be removed from the surface of the band 2 without being visibly damaged. The visible layer of the tamper evident film 62 is bonded unevenly to a transparent layer such that some parts will remain on the transparent layer while other parts remain bonded to the band 2. The separation may occur according to a predetermined pattern, leaving two separate indications of tampering i.e. on the transparent layer and on the band 2. Once this separation occurs, it is irreversible and the film 62 cannot be reunited to conceal the tamper indication, even if the tamper evident film 62 is replaced in exactly the same position.

The predetermined pattern may feature a word such as ‘void’ at regular intervals.

More specifically, the tamper evident film 62 is made up of a top layer, being clear PET film, which is treated with a number of proprietary processes to apply a coloured second layer which attaches with irregular strengths to certain areas of the top layer. The areas to which the coloured layer is bonded to the PET with greater strength can be specified to form shapes, patterns, words or a combination of these (specified bond). The coloured second layer’s outwardly facing surface has adhesive 15*c* which bonds to a wide range of surfaces with a uniform consistency. The adhesive 15*c* on the outwardly facing surface is weaker than the specified bond, but stronger than the general bond of the coloured second layer to the top layer (i.e. the area which is not treated to form specified bonds). The result is that once the tamper evident film 62 is adhered to a third surface, the coloured second layer will delaminate in a predetermined and inconsistent manner, part transferring onto the third surface, part remaining on the PET film in a manner determined by the specified bond. The resulting effect is suitable to provide tamper evidence.

Figure 5C:
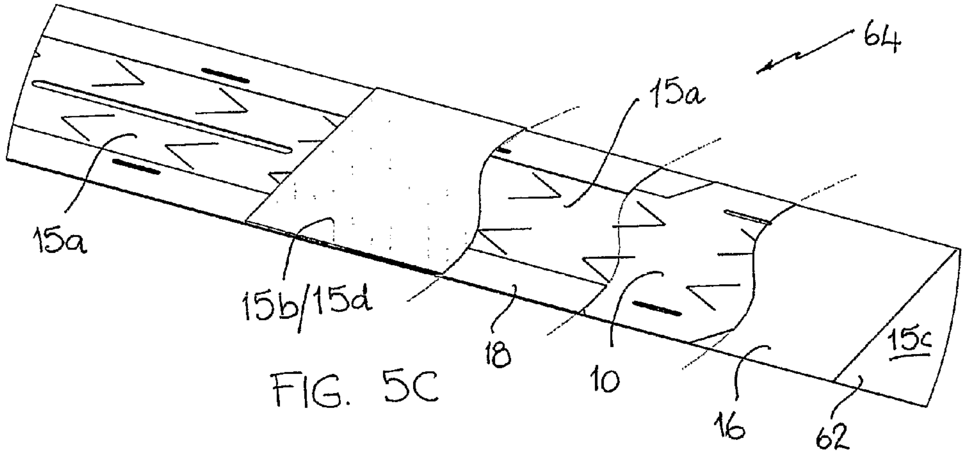
FIG. 5C is a schematic view showing the composition of the layers in an overlap portion of the composite strip.
Figure 5B:
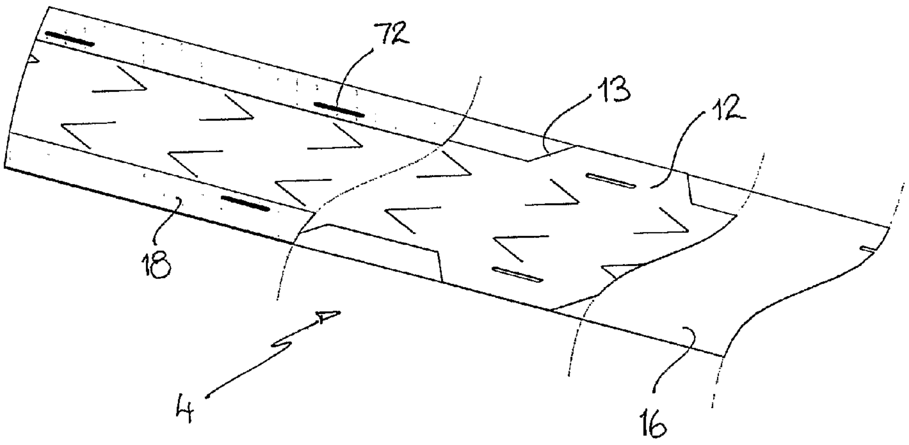
FIG. 5B is a schematic view showing the composition of the layers in the remainder of the composite strip (i.e. not at the distal portion)

FIG. 5C illustrates in greater detail the composition of the various layers at the overlap portion 64 (as indicated on FIG. 5). The rearmost layer is the tamper evident film 62 having adhesive layer 15*c*. The next layer is the reinforcing material 16, over which lies the TYVEK® material 10, with the outer edges of the reinforcing material 16 forming the overlapped margins 18. Over this is applied the adhesive 15*a* which is also present in the remainder of the distal portion 14, which is covered by release backing 15*b* or release backing 15*d* (it will be noted in FIG. 5A that the release backings 15*b* and 15*d* overlap as shown). In the case of release backing 15*b* this would also extend to cover the remainder of the distal portion 14.

FIGS. 6 to 10 illustrate the features of the buckle 6. The buckle 6 is in the form of a two part housing including a front part 30 and a rear part 32. The two parts 30, 32 are integrally formed and include an integral plastic hinge 34 interconnecting the two parts. The rear part 32 includes two spaced slots 36, 38 (more readily apparent in FIG. 7) through which a first end 40 (see FIG. 4) of the composite strip 4 may be threaded so as to extend through aperture 36, around the outside of the rear part 32 and back inside through slot 38, to fold back over itself inside the buckle 6. Additionally, a series of serrations or teeth 42 may be provided just beneath the slot 38 to facilitate with retention of the composite strip 4 within the buckle housing, once the two parts of the buckle 6 are sealed together, as explained below.

Additionally, the rear part 32 has a series of six projecting knobs 44 which cooperate with recesses 46 in the front part 30. The recesses 46 are aligned with the projecting knobs 44 in the closed configuration of the buckle housing. As can be seen from an inspection of FIG. 4, the first end portion 41 of the composite strip 4 is provided with twelve apertures 48 in the margins 18. These apertures 48 correspond in dimension to the projecting knobs 44. The knobs 44 are received in the apertures 48 when the first end portion 41 of the composite strip 4 is folded over itself.

In order to secure the buckle 6 to the first end portion 41 of the strip 4, the buckle undergoes a heat sealing process whereby the plastic projecting knobs 44 fuse in their recesses 46 and also fuse with the material of the composite strip 4. Once assembled, the buckle 6 and strip 4 can withstand significant loads.

A non-reversible release is incorporated into the buckle 6. The front part 30 is formed in three portions including: a central loop defining portion 50; and two side portions 52.

Figure 6:
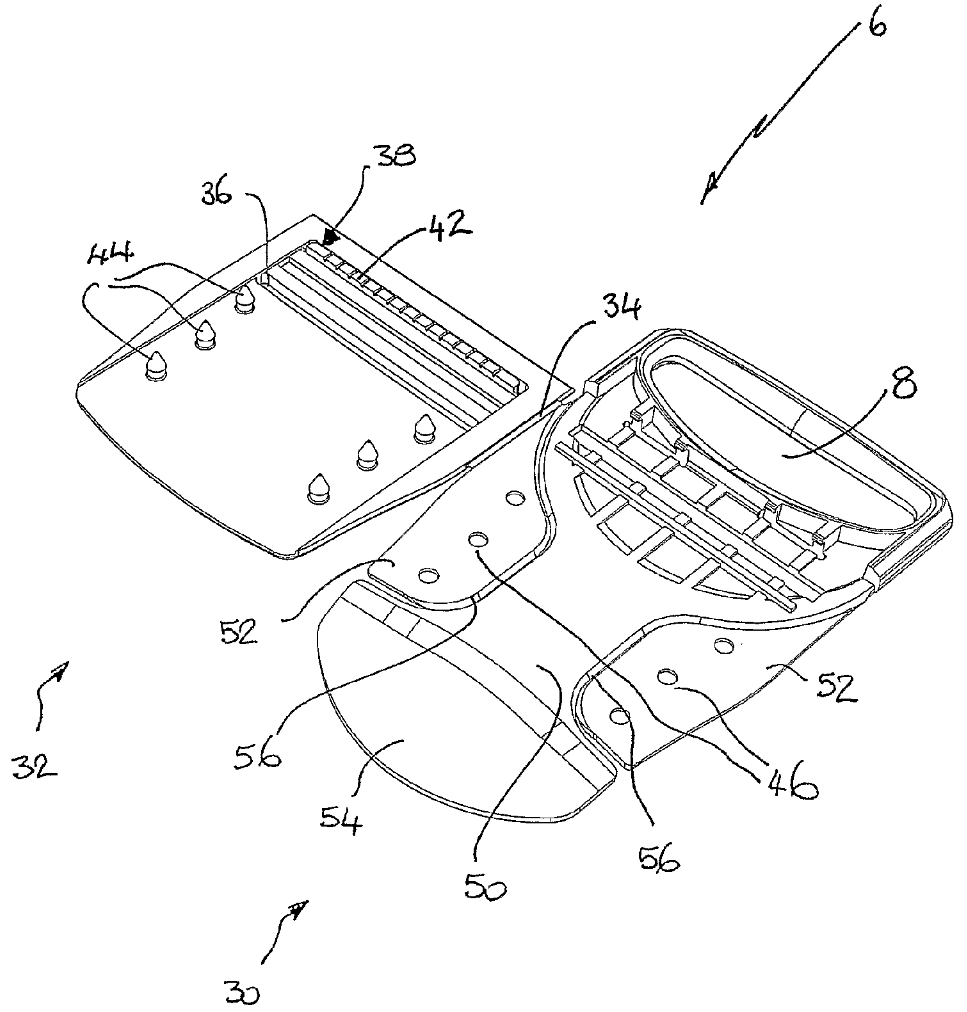
FIG. 6 is an interior perspective view of the buckle forming part of the tamper evidencing device shown in FIG. 4.
Figure 8:
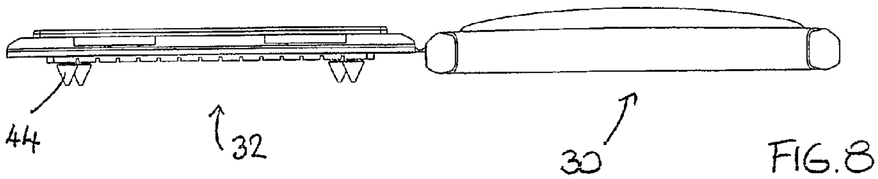
FIG. 8 is an end view of the buckle, looking from the top of FIG. 7.
Figure 7:
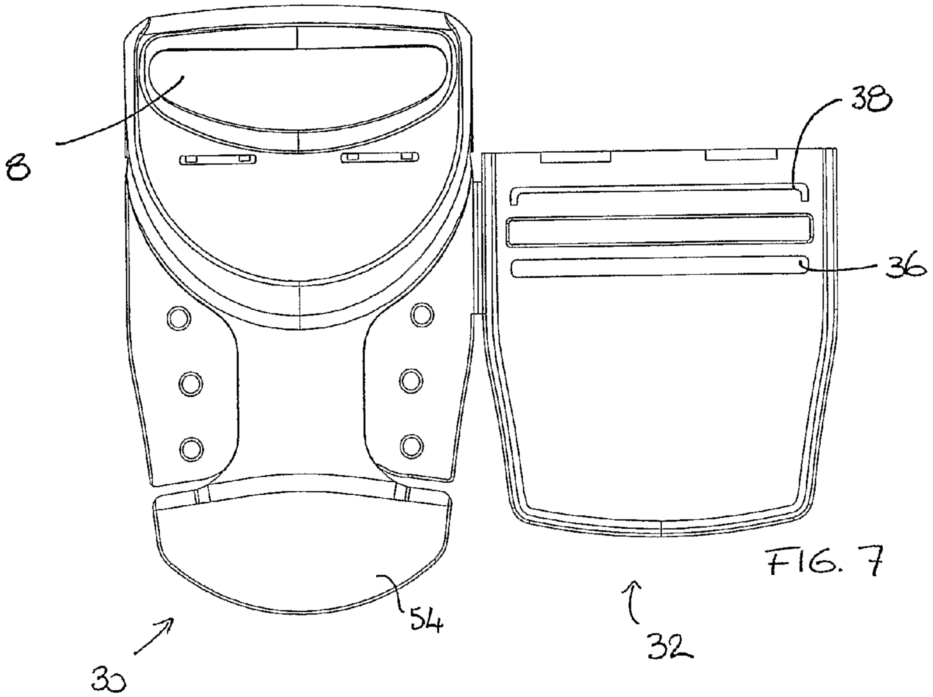
FIG. 7 is an exterior plan view of the buckle shown in FIG. 6.

The loop defining portion 50 defines the loop 8 at one end and incorporates a release tab 54 at the other end. The central loop defining portion 50 is connected to the side portions 52 by frangible connections. Two V-shaped grooves 56 extend between the central loop defining portion 50 and the side portions 52. These grooves 56 are formed on the inside of the buckle housing as shown in FIG. 6 and would not be immediately apparent from the rear of housing shown in FIG. 7. On pulling the release tab 54, a tear will be initiated along the V-shaped grooves 56 to separate the loop defining portion from the remainder of the buckle. The remainder of the buckle which serves as a securement portion will remain affixed to the composite strip 4. However, since the loop 8 is released from the encircling band, this will release the band from around the article. Once the loop defining portion is separated from the remainder of the buckle, the buckle will be visibly damaged and cannot be reassembled or reattached, leaving clear evidence of tampering.

The V-shaped grooves 56 are designed to withstand both vertical and horizontal forces likely to be exerted on the loop 8 during transportation and handling processes and during use, while facilitating the release from the release tab 54 with a minimum of force. This is achieved by the arrangement of the two V-shaped grooves 56 whereby the distance between the two grooves 56 increases as it approaches the loop 8.

Furthermore, each of the V-shaped grooves 56 is deep and wide at the release tab end, but becomes more shallow and narrow as it approaches the loop 8. This makes it easier to initiate a tear from the release tab 54 while making it difficult to make an unintended tear from the loop 8.

Figure 9:
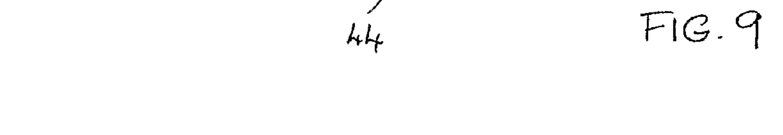
FIG. 9 is an side view of the buckle, looking from the bottom end of FIG. 7.

As apparent from FIG. 9, the release tab 54 is upwardly inclined to facilitate gripping when release is intended.

The buckle 6 may also include a tracking device to enable tracking of the article e.g. luggage in transit. This may be in the form of a Radio Frequency Identification Device which is sensed during passage past various sensors located at airports or other freight centres.

As shown in FIGS. 4 and 5, the tamper evidencing device 1 also includes four zip tab securing portions 22. As will be understood from the foregoing, these are also formed of tamper evident film and have release backing 15*d*. The purpose of the zip tab securing portions 22 is to join the band 2 to two adjacent zip tabs 23 of luggage (see FIG. 10E). This is achieved by removing the release backing 15*d* from one of the zip tab securing portions 22, threading it through the apertures in the adjacent zip tabs 23 and through aperture 72 in band 2, folding it approximately in half and then securing it to itself, adhesive side to adhesive side, end to end. Then the enlarged end portion is folded over itself crosswise (se FIG. 10F). Once secured in this manner, the zip tab securing portions 22 cannot be removed without causing visible damage to the tamper evident film.

Figure 10F:
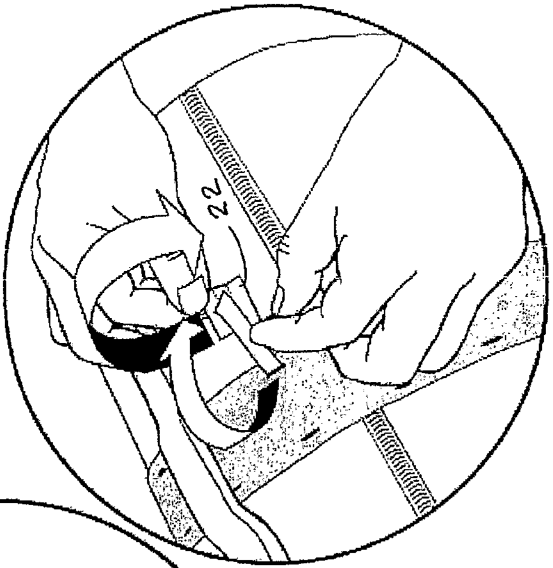

The zip tab securing portions 22 are attached to a fixed point on the tamper evidencing band 2. Regularly spaced apertures 72 are located along the margins 18 of the composite strip 4 (see also FIG. 4). The zip tab securing portion 22 may be inserted through the holes in the adjacent zip tabs 23 and also through the aperture 72 to thereby anchor the zip tabs to the tamper evidencing band 2 as shown in FIG. 10F. Alternatively, the user may insert one of the zip tabs through one of the apertures 72 before applying the zip tab securing portion 22 through the zip tabs (or locking points).

Once isolated in this manner, the zip tabs 23 cannot be removed from their isolation points on the tamper evidencing band 2 without visibly damaging either the band 2 or the zip tab securing portion 22. This prevents one or more zip sliders from moving relative to the zipper and the point to which it is affixed to the band 2. Isolating the zip tabs 23 in this manner enhances the tamper detection function of the device, as it prevents unrecorded access to zipped compartments on an item and also prevents the concealment of an act of tampering like a zip breach as the zip sliders cannot be moved or manipulated to reseal or conceal a broken zip chain without leaving an indication of tampering on the tamper evidencing band 2 or the zip tab securing portion 22.

Zip tabs may also be applied to other locking points of the luggage or freight item.

As an alternative to the zip tab securing portions 22, cable ties 110 such as those disclosed in FIGS. 27 to 32 may be used.

Figure 27:
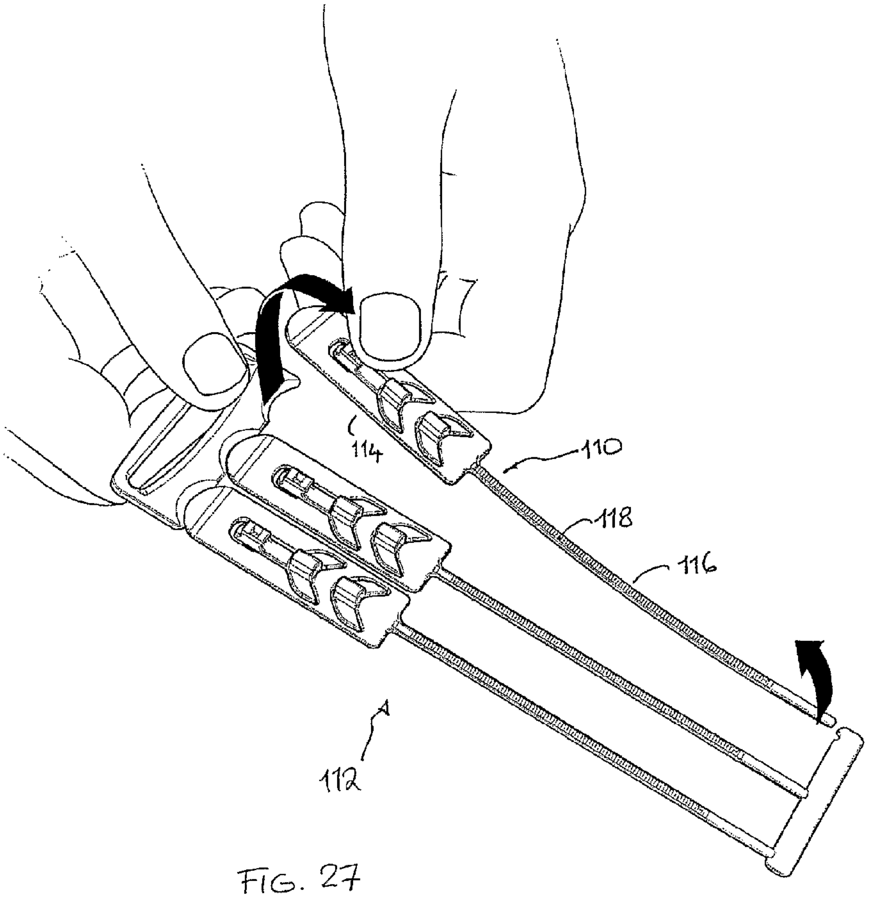
FIG. 27 shows a set of cable ties.

The cable ties 110 may be formed as a 3-tie moulded assembly 112. Each cable tie 110 may be frangibly connected to the assembly 112 for easy removal by hand as shown in FIG. 27. Each cable tie 110 has a head portion 114 and a tail portion 116. The tail portion 116 is formed with a series of teeth or a serrated upper surface 118 as shown. The head portion 114 is backed by a strip of tamper evident film 120, a part of which is visible in FIG. 32.

Figure 28:
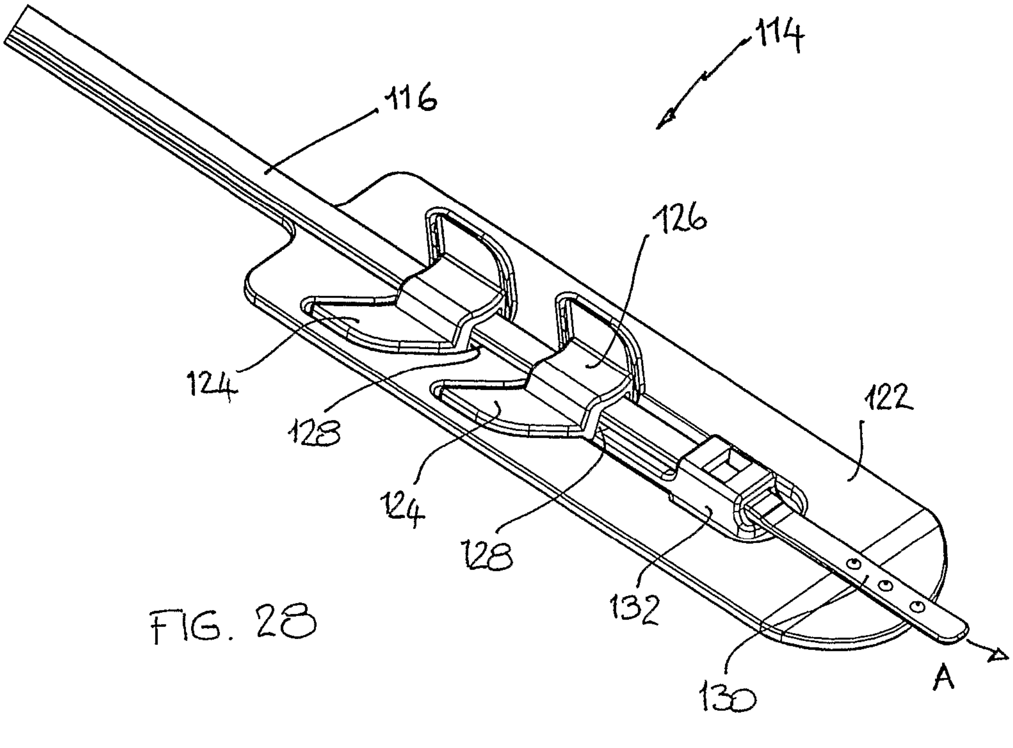
FIG. 28 is a perspective view of the top side of one of the cable ties in its assembled configuration as a zip tab securing portion.

The head portion is more clearly shown in FIG. 28. The head portion 114 is in the form of a substantially rectangular plate 122 with two-spaced chevron portions 124. Each chevron portion 124 is integrally formed with the remainder of the plate 122. Frangible connections (not shown) exist between each chevron portion 124 and the plate 122. Further, each chevron portion 124 is formed with a channel portion 126 which defines a tunnel 128 through which the tail end 116 of the cable tie 110 may be inserted. The two tunnels are aligned and enable the tail end 116 to extend through the tunnels 128 in a manner overlying the general plane of the top surface of plate 122. Additionally, the distal end 130 of tail 116 is thinner so as to facilitate feeding through the tunnels 128.

It is noted that the provision of two spaced tunnels 128 will be easier to feed the tail end 116 through than one long tunnel.

Figure 29:
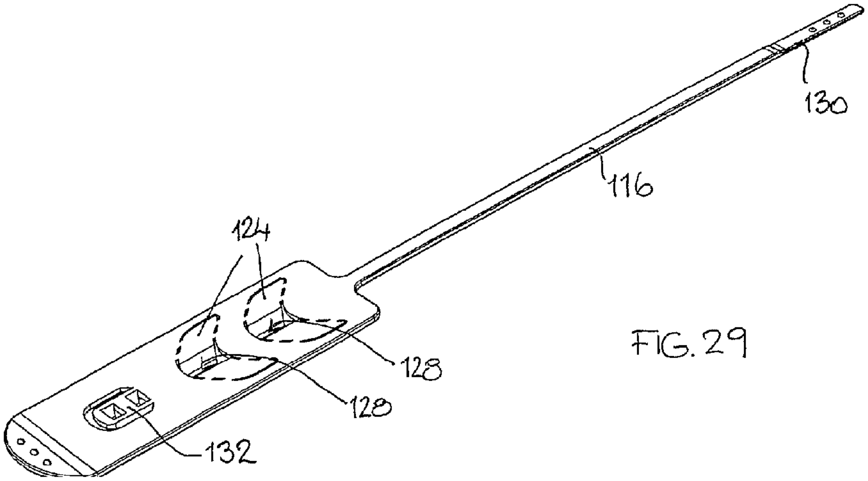
FIG. 29 is an underside of the cable tie of FIG. 28 (with the layer of tamper evident film removed for clarity), except in unassembled configuration.

The head portion 114 also includes a locking portion in the form of ratchet portion 132. The ratchet portion 132 cooperates with the serrated upper edge 118 on the tail portion 116 to permit feeding in a direction indicated by arrow A but not in the opposite direction. As shown in FIG. 29, the ratchet portion 132 extends rearwardly towards the chevron portions 124 along optional lines of weakness (not shown), the purpose of which will be explained.

The tamper evident film 120 is affixed to the rear of the chevron portions 124 and the ratchet portion 132.

Figure 30:
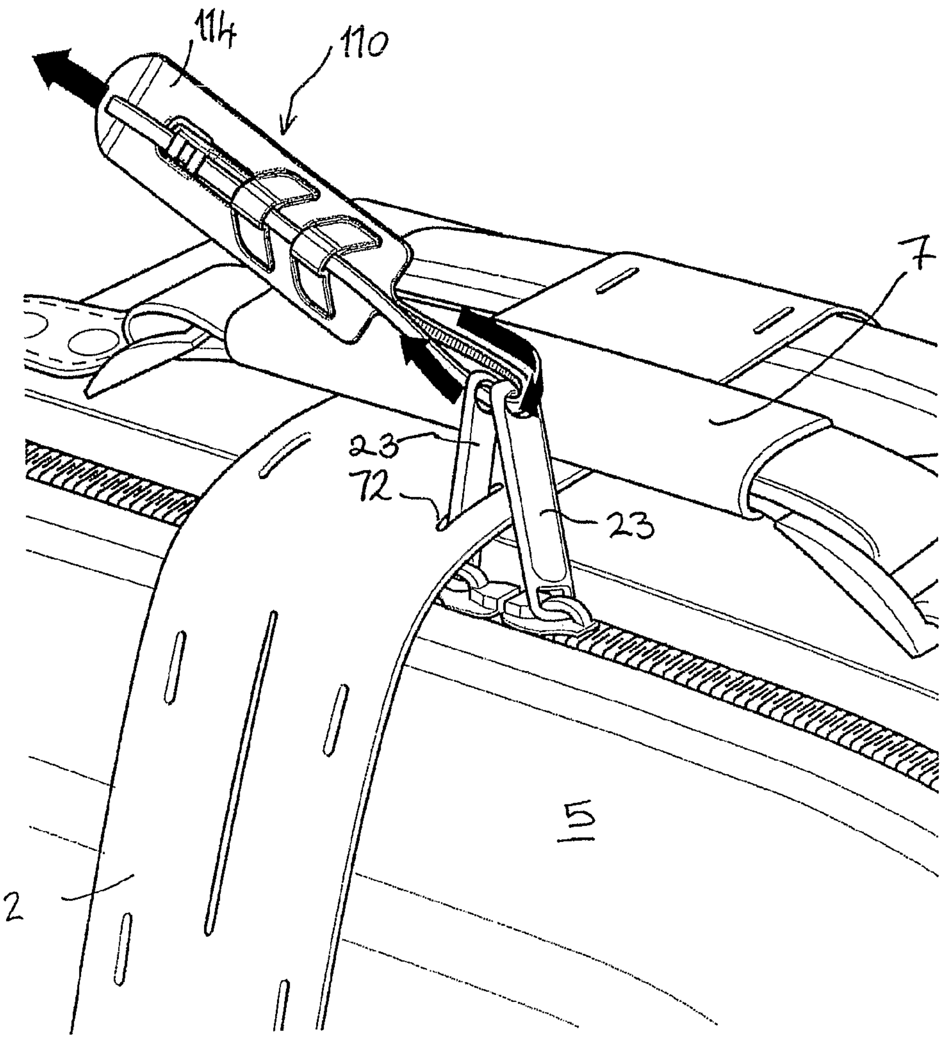
FIG. 30 illustrates a first mode of using the cable tie as a zip tab securing portion.
Figure 31:
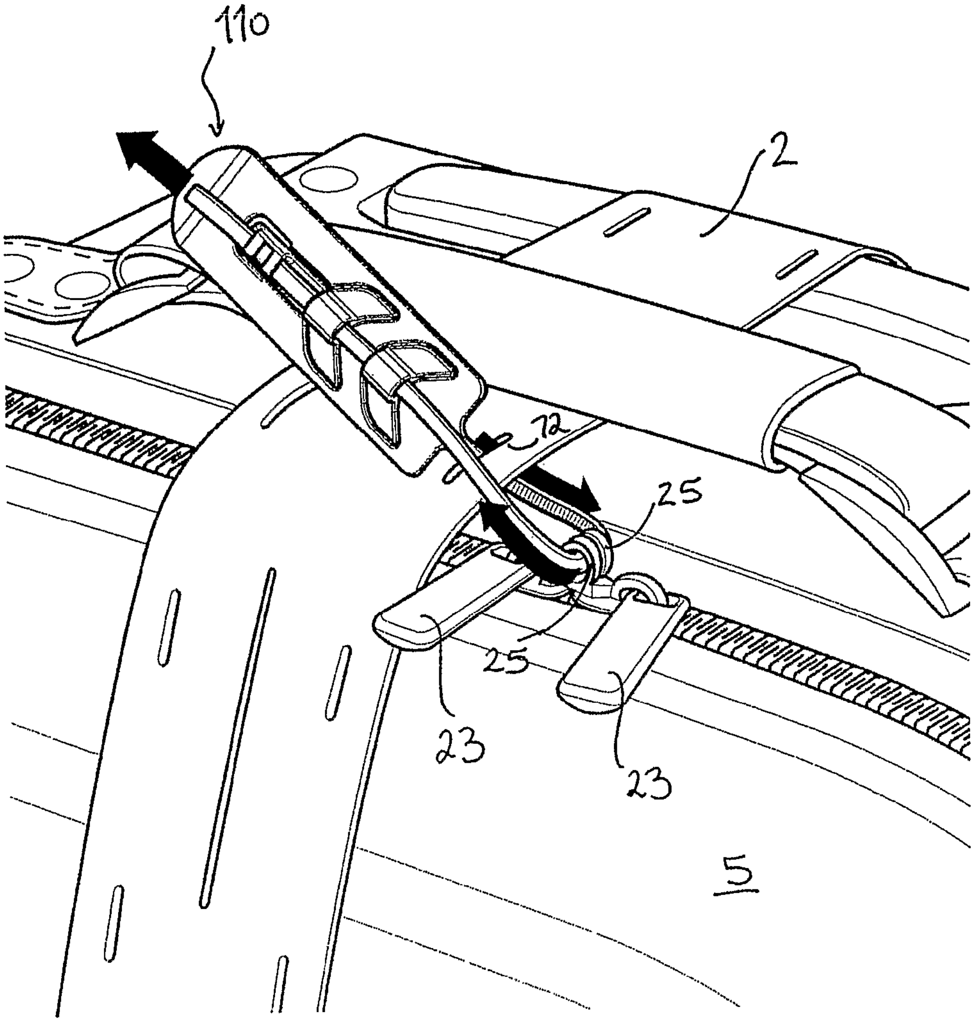
FIG. 31 illustrates a second mode of using the cable tie as a zip tab securing portion.

The cable ties 110 may be used to secure the zip tabs 23 of transit article such as luggage item 5 in the manner shown in FIG. 30 or alternatively as shown in FIG. 31. In FIG. 30, one of the two adjacent zip tabs 23 is inserted through aperture 72 in the band 2. Then, the tail end 116 of the cable tie 110 is threaded through the zip tabs 23 and then through the head portion 114. The zip tabs 23 are thus confined. The band 2 cannot move beyond the confines of the luggage handle 7. By being tethered to the band 2, the zip tabs 23 cannot move substantially beyond the confines of luggage handle 7.

In the alternative, illustrated in FIG. 31, the cable tie 110 may be secured around the aperture 72 in the band 2 and the adjacent locking rings 25 of the zip sliders.

It is noted that band 2 may also be confined in movement by another band 2 when threaded through a cross strip hole 70 in either band.

As will be understood, the cable tie 110 cannot be removed without providing evidence of tampering. The cable ties 110 are a single-use device (as is the security device 1) so the cable tie 110 is designed to be easily removed by the person responsible for the transit article 5 once the article 5 reaches its destination. However, if article 5 reaches its destination without the cable tie 110 or showing evidence of having been tampered with, the person responsible can deduce that the article 5 has been tampered with.

Figure 32:
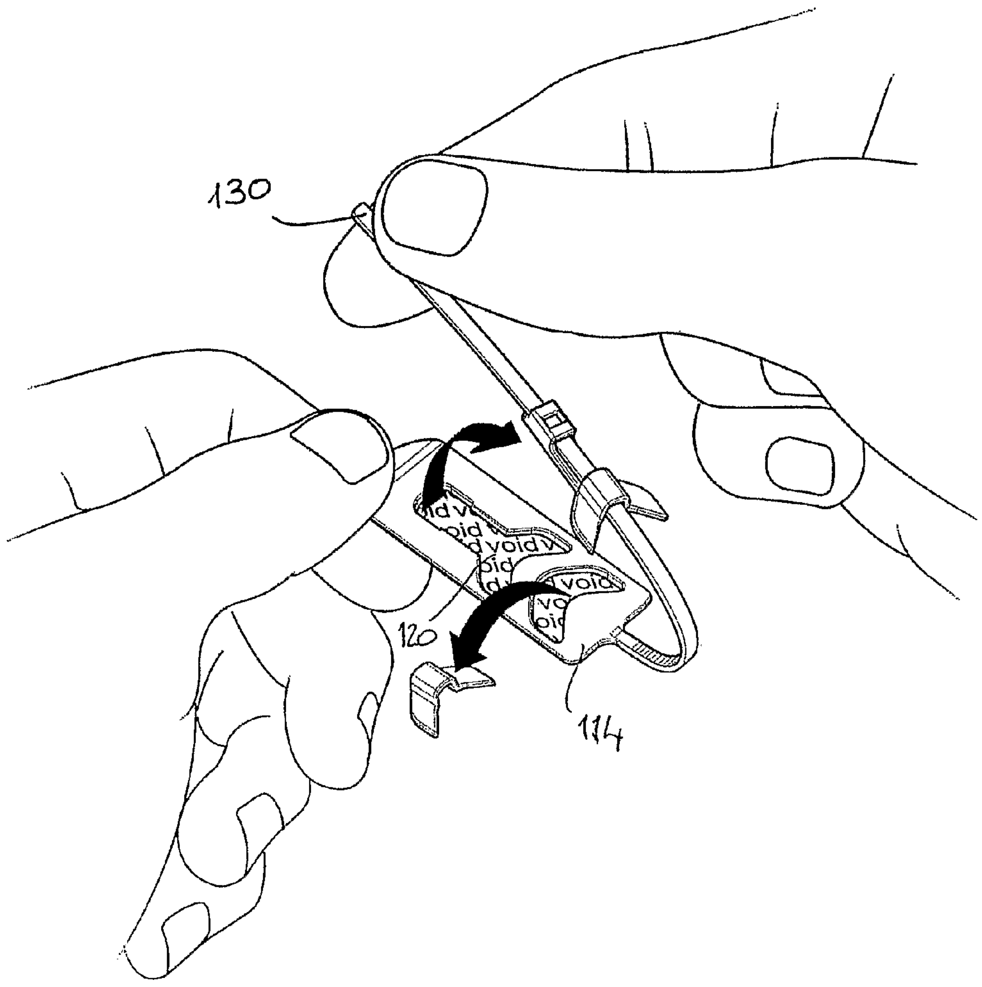
FIG. 32 is a schematic view illustrating the tamper evidencing nature of the cable tie.

The cable tie 110 is removed by pulling on the distal end 130 in the manner illustrated in FIG. 32. Because of the presence of parallel lines of weakness, the ratchet portion 132 will tear away from the remainder of the plate 122. Additionally, the chevron portions 124 will also be detached as shown in FIG. 32. Because tamper evident film 120 has been secured to the underside of the plate 122, the tamper evident film will bear evidence of removal as shown. The cable tie 110 functions to provide tamper evidence because the ratchet portion 132 and the chevron portions 124 are irreversibly separated from the plate 122 and cannot be reinstated without evidence of tampering. It is also noted that ratchet portion 132 is too large to fit through tunnels 128.

The cable ties possess a number of additional features. The shape of the chevron portions 124 provide a directional guide for persons installing the cable tie as they indicate the direction in which the tail portion 116 should be inserted through the tunnels 128. They are also shaped to initiate a tear from the centre thereof and for the tear to extend in the direction opposite to arrow A. Additionally, the duplicate chevron portions allow for one of the chevron portions 124 to become damage through handling. However, the existence of a second intact chevron portion 124 indicates that no tampering has taken place.

In addition, a more comprehensive identification system may be employed in the tamper evidencing device 1. A unique identifier may be provided on the residual portion 66 of the tamper evidencing film 62. This unique identifier may comprise a bar code and a serial number. A corresponding unique identifier may be provided on the receipt portion 20, including on each of the zip tab securing portions 22 (including cable tie 110) and on the receipt stub 21 retained by the person responsible for the article/luggage/freight item.

The provision of the unique identifier on the residual portion 66 of the tamper evidencing film 62 means that the unique identifier cannot be removed or tampered with, without visible evidence in the tamper evidencing film. Furthermore, the tamper evidencing band 2 cannot be removed from the article and substituted by another tamper evidencing band since the unique identifier will not match the unique identifier on the receipt stub 21 retained by the person responsible. Similarly zip tab securing portions 22 cannot be removed and substituted as the unique identifier will not match the unique identifier on the tamper evidencing band 2 or the receipt stub 21. Furthermore, the receipt stub 21 which is retained by the person responsible has a release backing which may be removed so that the receipt stub 21 can be attached to travel documents such as a boarding pass or other evidentiary documents such as a freight receipt to permanently associate the article secured by the band 2 with a particular transaction or freight/luggage movement. If the receipt is applied by an official to the document it strengthens the evidentiary value of the receipt stub 21 because the receipt stub 21 cannot be removed from the document without providing evidence of tampering. Thus the owner cannot substitute another receipt stub 21 to claim ownership of an alternative article or an article which does not exist. This mitigation of fraudulent behaviour enhances the evidentiary value of the present system.

The comprehensive identification system may also include the integration of additional identifiers such as remote frequency identification devices (RFID) into the tamper evidencing device 1 that hold common or unique data. Where such additional identifiers are integrated into the tamper evidencing device 1, they may be included by housing such a device within the buckle 6 (as later shown in a second preferred embodiment of the security device), or in between the layers of the composite strip 4 during the manufacturing process, or by affixing the device via a suitable attachment means (i.e. heat sealing or adhesive) to the buckle 6 or to the band 2 either during or after the manufacturing process.

The advantage is that a number of unique identifiers can be applied in a single operation in a tamper evident manner. This allows tracking by the various tracking systems which may be employed. When so applied, this shall allow for an item to be tracked by a number of tracking systems to protect against the potential failure or malfunction of one of the systems. It may also allow for different incompatible systems which may exist in different facilities. Some facilities may be in the process of transition from one system to another (i.e. barcode to RFID). The data contained or associated with the various identifiers may be read simultaneously and cross-verified within the same transportation environment.

Furthermore, the robust design of the tamper evidencing device 1 as previously described provides the unique advantage of allowing such devices to be affixed to an item in a manner that is able to withstand significant weight loads and handling stresses that far exceed existing 'single use' mediums that affix tracking devices to items (e.g. a device affixed to a transit item via a film with a single coated adhesive). Accordingly, the use of the tamper evident device 1 in this manner will reduce accidental loss of identifiers ('tag offs') from items being handled or in transit.

Cross strip holes 70 provide for bands 2 to be arranged transversely to each other by threading one band 2 through the cross strip holes of another band as described in our previous application WO 2007/041798. The tear resistant flexible plastic reinforcing layer 16 and the high tensile filaments (if any) reinforce the material surrounding the cross strip holes 70, reducing any distortion and tearing which may occur when the material surrounding these holes 70 is subjected to stress. When tearing does occur, it is less likely to travel across the strip. This increases the functionality of the strip, by reducing false indications of tampering and minimising material failure during freight/baggage transportation and handling.

FIGS. 11 to 26 now describe a second preferred form of the security device 1' especially intended as a postage and freight article tie.

FIGS. 13 to 18 illustrate the features of an alternative form of the buckle 6' especially intended for postage and freight articles e.g. packages. The alternative form of the buckle is similar in many respects to the first form and therefore like numerals will be used to represent like parts, with the addition of the prime symbol (') to show that the parts relate to the new embodiment.

Figure 11:
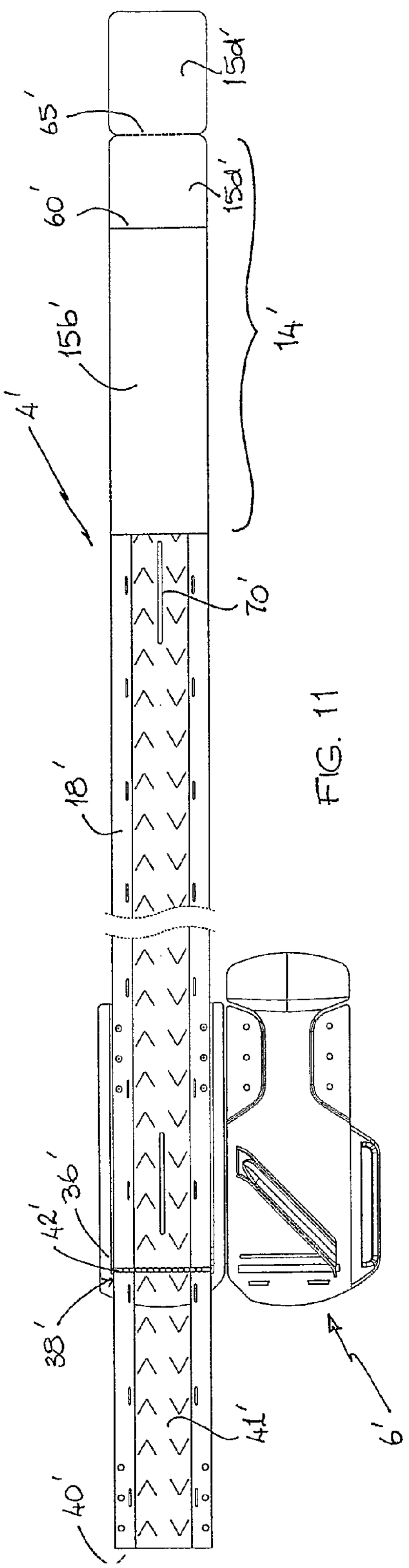
FIG. 11 is a plan view of the front side of a nearly completed tamper evidencing device according to a second preferred embodiment of the present invention.
Figure 12:
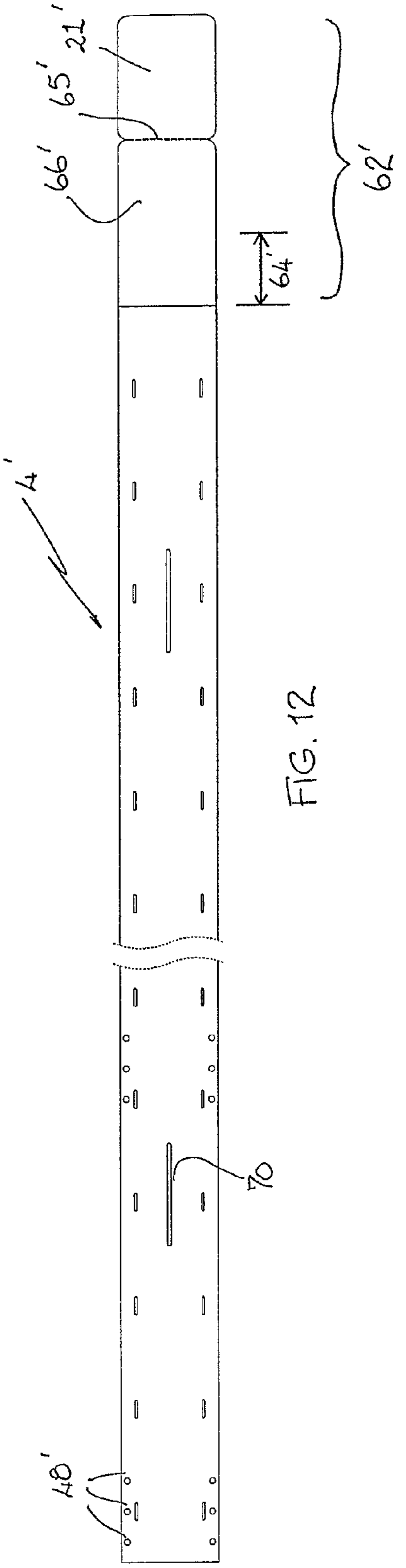
FIG. 12 is a plan view of the rear side of the composite strip for the tamper evidencing device of FIG. 11.
Figure 13:
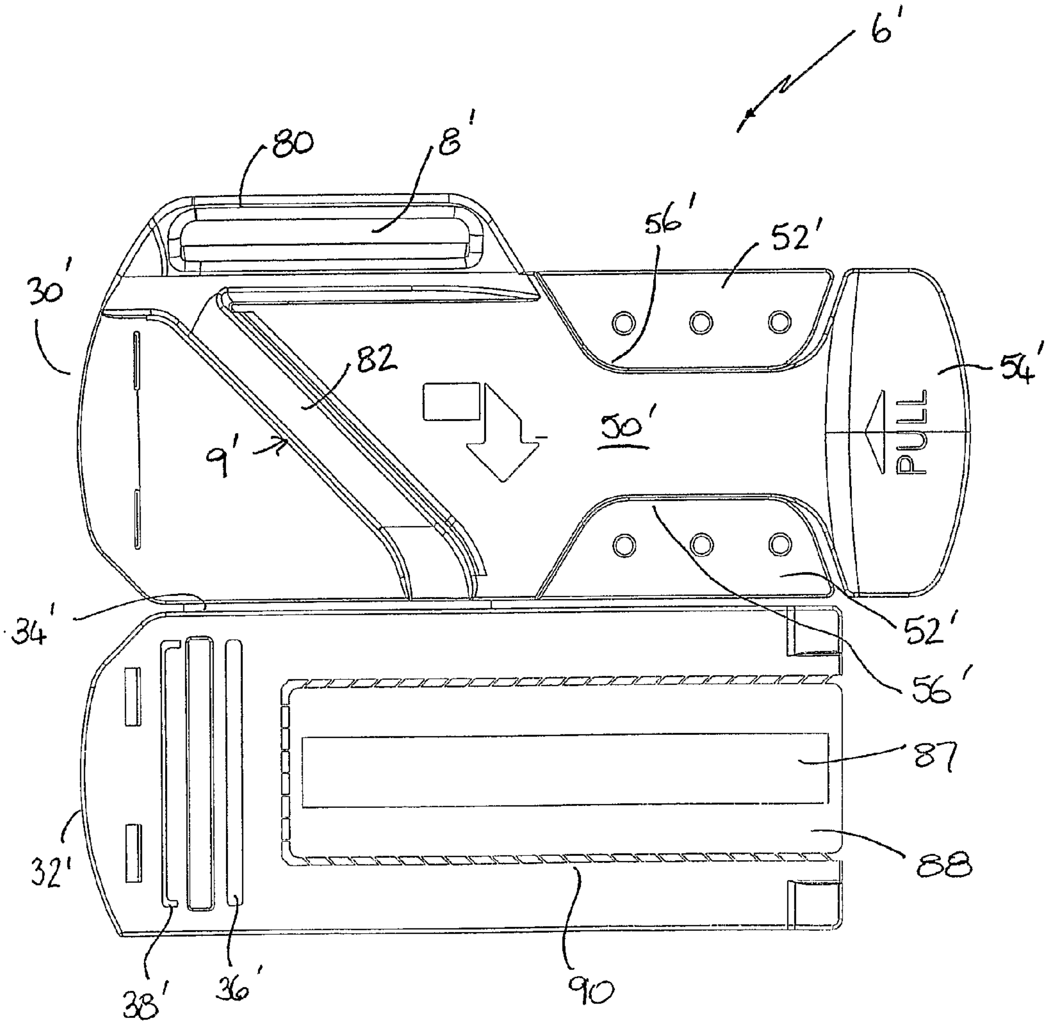
FIG. 13 is a plan view of the outside of a buckle forming part of the tamper evidencing device of FIG. 11.

FIGS. 11 and 12 illustrate the composite strip 4' which is similar in most respects to that illustrated in FIGS. 1 to 5C. The composite strip 4' is used with buckle 6'. The main difference is the omission of the zip tab securing portions 22 which may not be required for postage or freight articles. The other possible difference may be the omission of the regularly spaced apertures 72 which are used in connection with the zip tab securing portions 22. Therefore, these apertures may be omitted in this embodiment of the invention. In view of the similarities with the first embodiment, like numerals are used to represent like features with the addition of a prime symbol (') to indicate the second embodiment.

The buckle 6' is in the form of a two part housing including a front part 30' and a rear part 32'. The two parts 30', 32' are integrally formed and include an integral plastic hinge 34' interconnecting the two parts. The rear part 32' includes two spaced slots 36', 38'. As shown in FIG. 11, a first end 40' of the composite strip 4' may be threaded so as to extend through aperture 36', around the outside of the rear part 32' and back inside through slot 38', to fold back over itself inside the buckle 6'. Additionally, a series of serrations or teeth 42' may be provided just beneath the slot 38' to facilitate with retention of the composite strip 4' within the buckle housing, once the two parts of the buckle 6' are sealed together, as explained below.

Figure 15:
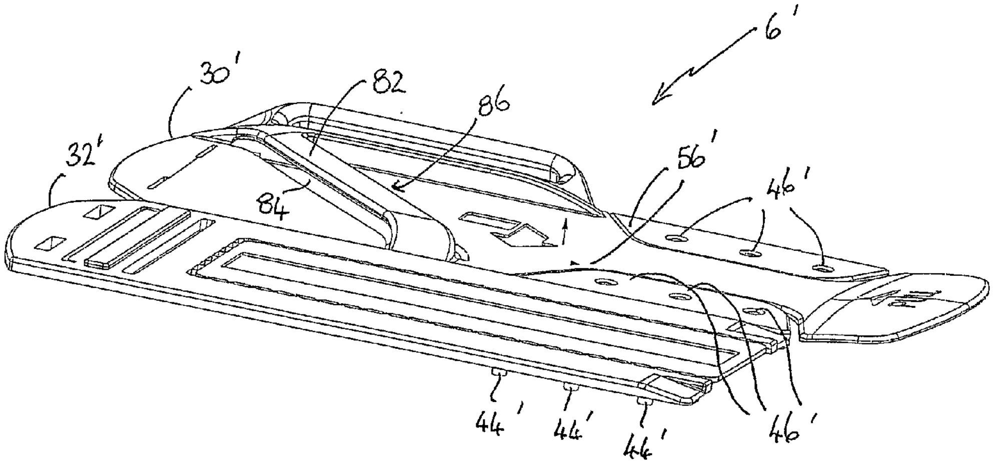
FIG. 15 is a further perspective view showing the outside of the buckle of FIG. 13.
Figure 14:
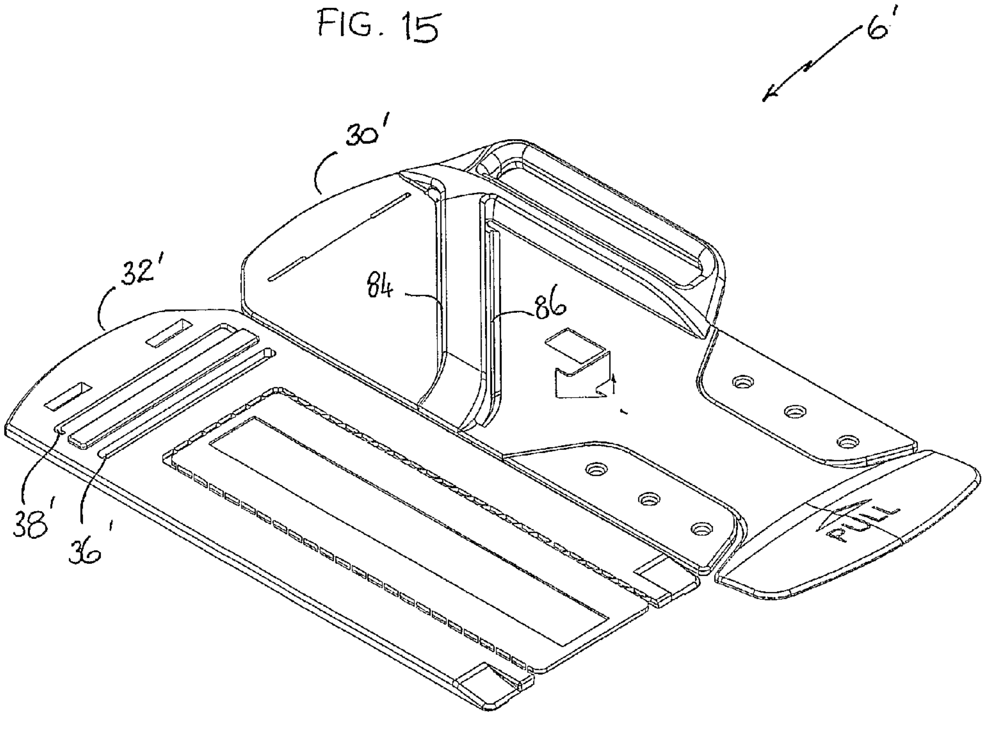
FIG. 14 is a perspective view showing the outside of the buckle of FIG. 13.
Figure 16:
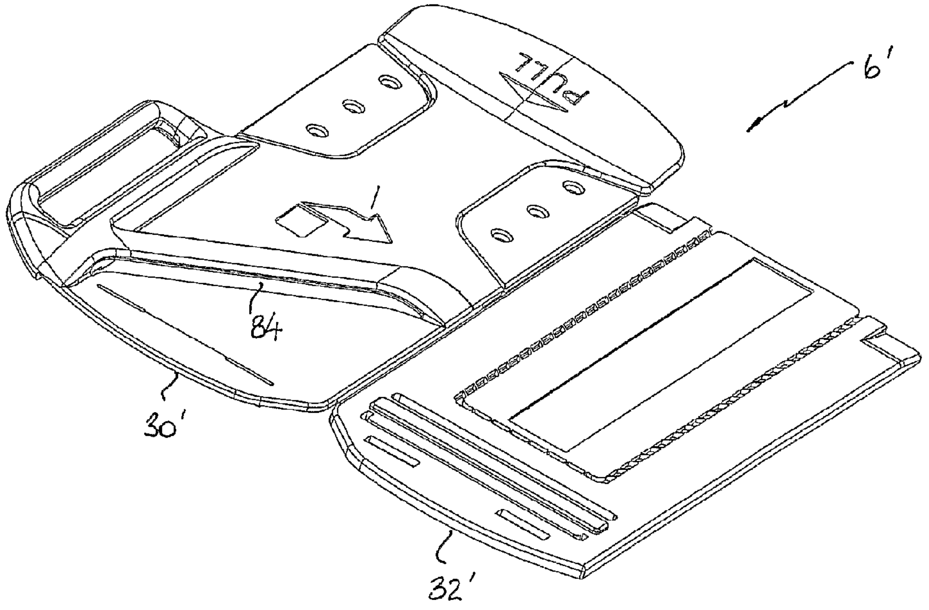
FIG. 16 is a further perspective view still showing the outside of the buckle of FIG. 13.
Figure 17:
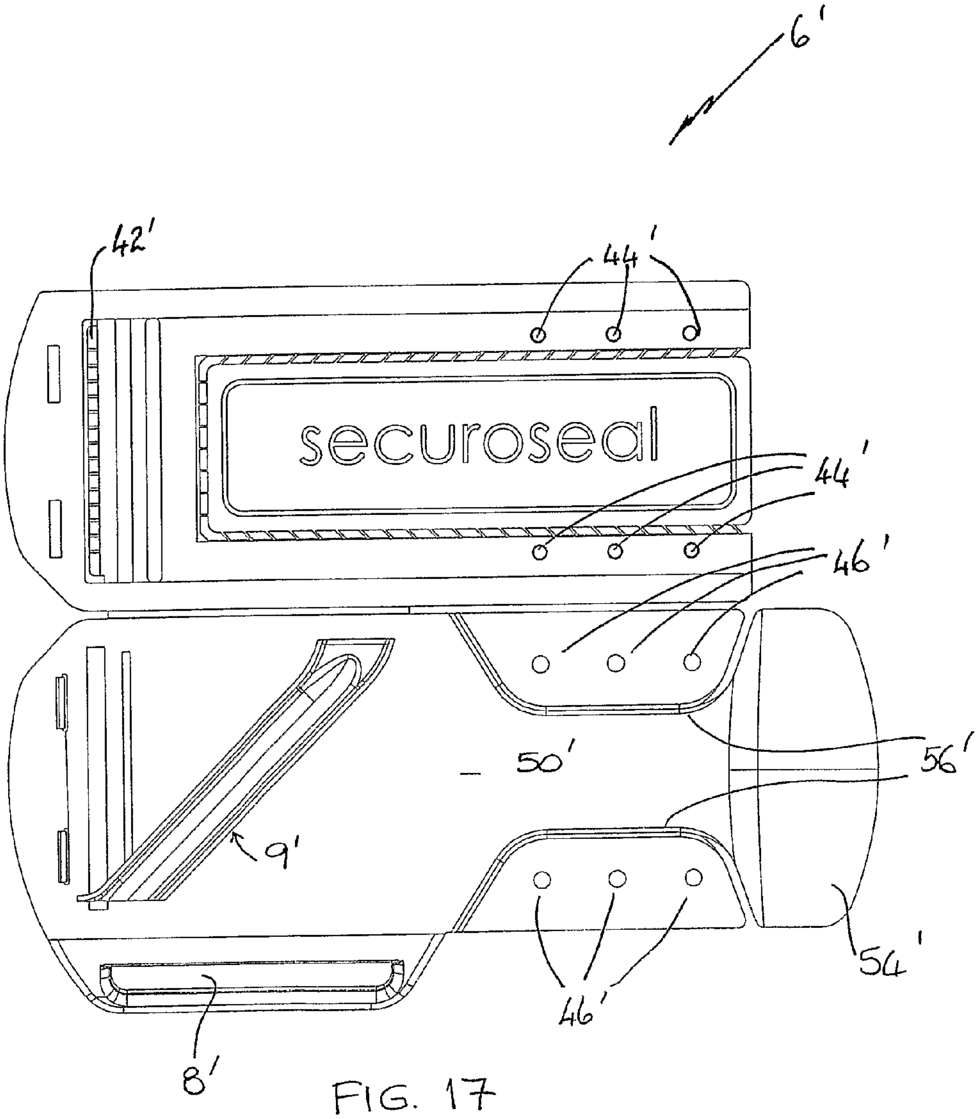
FIG. 17 is a plan view showing the inside of the buckle of FIG. 13.

Additionally, as shown in FIGS. 15 and 17 the rear part 32' has a series of six projecting knobs 44' which cooperate with recesses 46' in the front part 30'. The recesses 46' are aligned with the projecting knobs 44' in the closed configuration of the buckle housing. As shown in FIG. 11, the first end portion 41' of the composite strip 4' is provided with twelve apertures 48' in the margins 18. These apertures 48' correspond in dimension to the projecting knobs 44'. The knobs 44' are received in the apertures 48' when the first end portion 41' of the composite strip 4' is folded over itself.

In order to secure the buckle 6' to the first end portion 41' of the strip 4', the buckle undergoes a heat sealing process whereby the plastic projecting knobs 44' fuse in their recesses 46' and also fuse with the material of the composite strip 4'. Once assembled, the buckle 6' and strip 4' can withstand significant loads.

Figure 18:
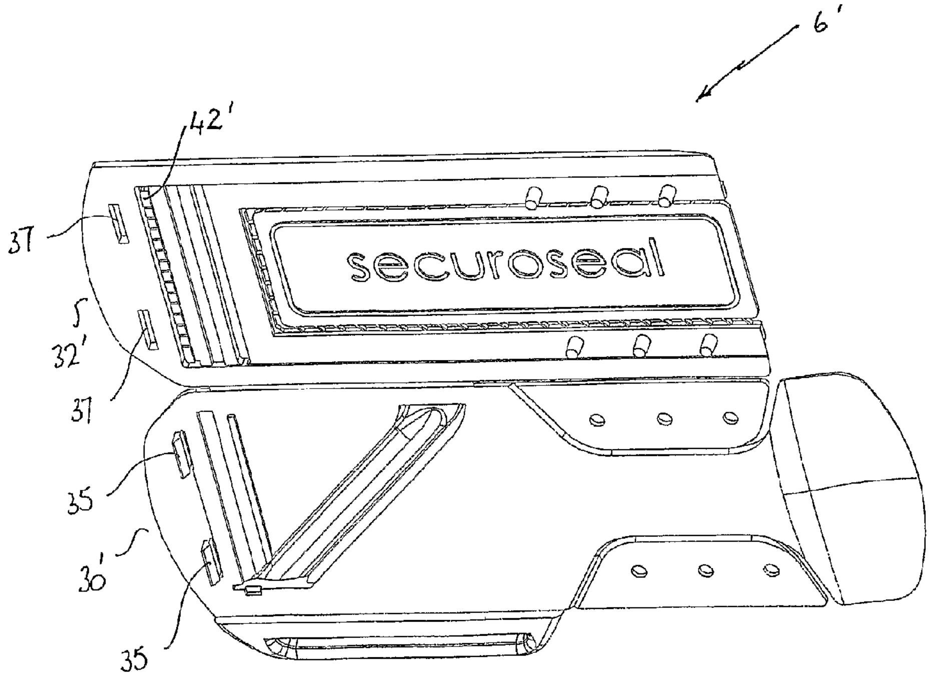
FIG. 18 is a perspective view showing the inside of the buckle of FIG. 13.

Additionally, as shown most clearly in FIG. 18, front part 30' includes projecting knobs 35 which engage with recesses 37 in rear part 32'. Their purpose is to keep the front and rear parts of the buckle together to enable ease of manufacture (i.e. heat sealing), enhance the seal of the buckle to resist tampering and also to increase the capacity of the fully assembled buckle to withstand upward forces which may be exerted upon the looped bands during transit (i.e. picking up a freight item by the band at the area adjacent to the guide 9).

A non-reversible release is incorporated into the buckle 6'. The front part 30' is formed in three portions including: a central loop or guide defining portion 50'; and two side portions 52'.

The loop or guide defining portion 50' defines first and second loops or guides 8' and 9'. Loop 8' is defined in part by a side bar 80. The guide 9' is defined in part by angled bar 82 which is raised from the general plane of loop defining portion 50' to define two openings 84, 86 alongside the bar 82 (see FIGS. 15 and 16). Thus, the composite strip 4' may be looped around guide 9'.

The loop or guide defining portion also incorporates an optional release tab 54' at the other end. The central loop defining portion 50' is connected to the side portions 52' by frangible connections. Two V-shaped grooves 56' extend between the central loop defining portion 50' and the side portions 52'. These grooves 56' are formed on the inside of the buckle housing as shown in FIG. 17. On pulling the release tab 54', a tear will be initiated along the V-shaped grooves 56' to separate the loop or guide defining portion 50' from the remainder of the buckle. The remainder of the buckle which serves as a securement portion will remain affixed to the first end portion 41' of the composite strip 4'. However, since the loop 8' and guide 9' are released from the buckle, this releases the encircling bands from around the article. Once the loop or guide defining portion 50' is separated from the remainder of the buckle, the buckle will be visibly damaged and cannot be reassembled or reattached, leaving clear evidence of tampering.

The V-shaped grooves 56' are designed to withstand both vertical and horizontal forces likely to be exerted on the loop 8' and guide 9' during transportation and handling processes and during use, while facilitating the release from the release tab 54' with a minimum of force. This is achieved by the arrangement of the two V-shaped grooves 56' whereby the distance between the two grooves 56' increases as it approaches the guide 9' and the loop 8'. Furthermore, each of the V-shaped grooves 56' is deep and wide at the release tab end, but becomes more shallow and narrow as it approaches the loop 8' and guide 9'. This makes it easier to initiate a tear from the release tab 54' while making it difficult to make an unintended tear from the loop 8' and guide 9'.

As apparent from FIG. 15, the release tab 54' is upwardly inclined to facilitate gripping when a tear is intended.

The buckle 6' may also alternatively be formed with each of the characteristics as described but without release function by excluding the release tab 54' and each of the V-shaped grooves 56' from the design of the buckle 6'.

Figure 20:
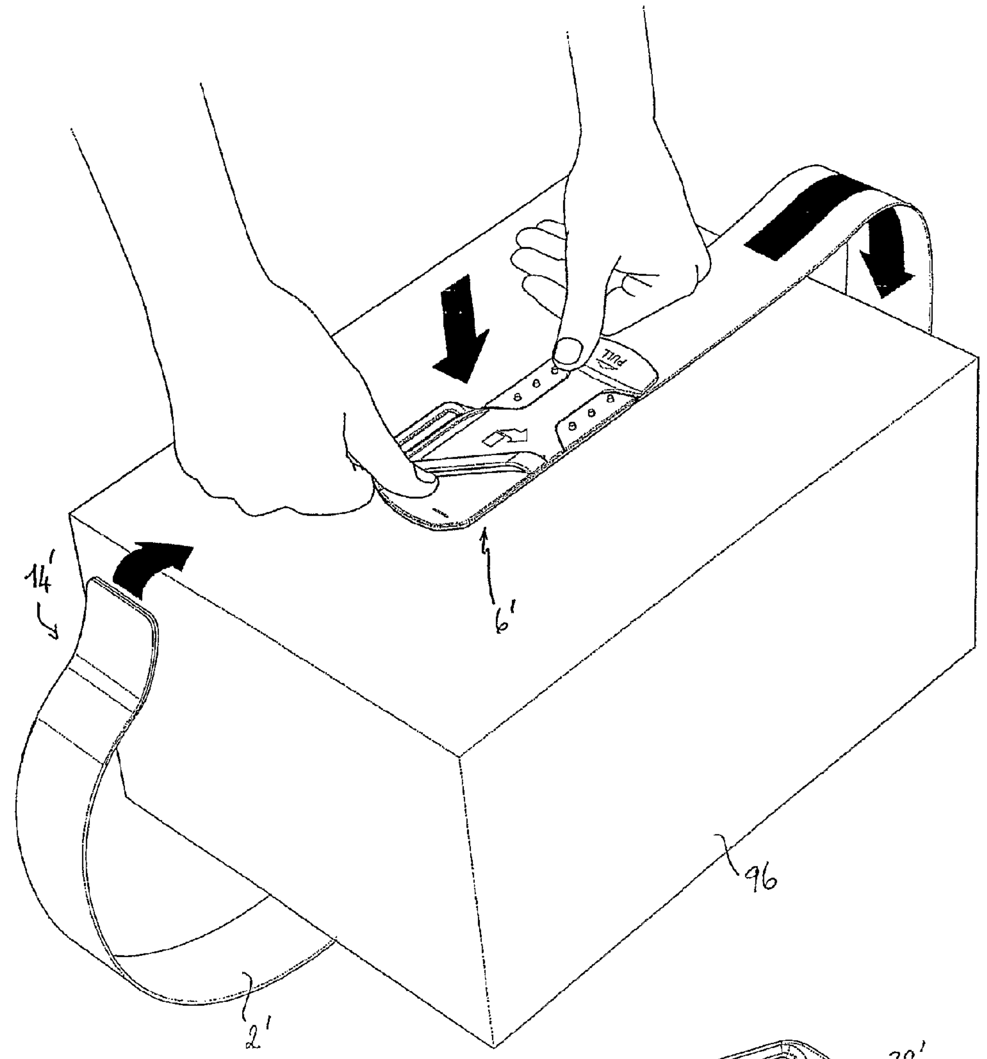
FIG. 20 shows a second step.

The buckle 6' may also include a tracking device 87 (see FIG. 13) to enable tracking of the article in transit. This may be in the form of a Radio Frequency Identification Device (RFID) which is sensed during passage past various sensors located at airports or other freight centres. The tracking device is suitably contained with a tracking portion 88 formed as part of the rear part 32'. The tracking portion 88 is non-reversibly separable from the remainder of rear part by frangible connections 90. Furthermore, an adhesive layer 94 (see FIG. 19) is provided on the underside of the tracking portion 88 to secure the buckle 6' to the freight article 96 (FIG. 20). The adhesive bond is intended to be stronger than the frangible connections 90 so that the tracking portion 88 with tracking device 87 remains with the article 96 in the event that the buckle's removal is attempted and/or achieved. The tracking device 87 is provided on the underside of the tracking portion, separated from the article by the adhesive layer 94.

Specifically, in the event that the tracking portion 88 is released from the remainder of the buckle 6', the tracking portion 88 will remain affixed to the article by the adhesive bond of adhesive layer 94, with the tracking device 87 being contained in between the adhesive layer 94 and the surface of the tracking portion 88 which faces the article. The tracking device 87 therefore remains isolated and protected by the tracking portion 88 even after it is separated from the remainder of the buckle 6'.

Figure 19:
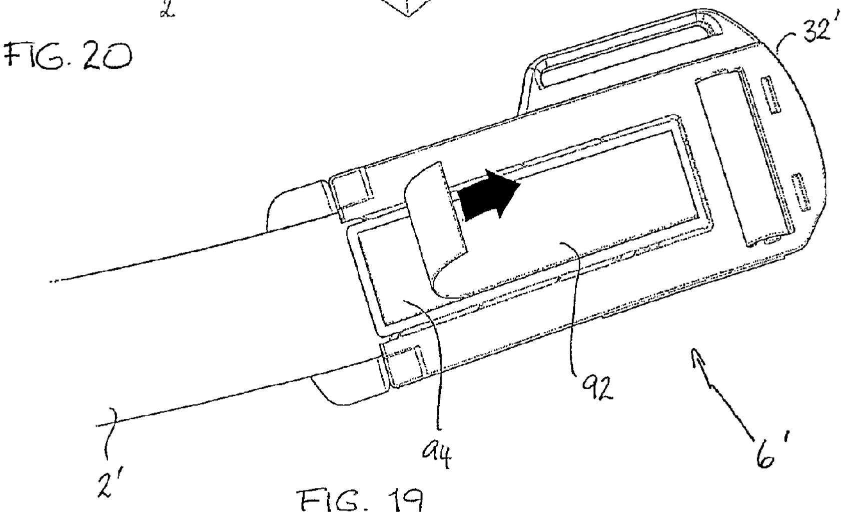
FIG. 19 is a perspective view of the second preferred embodiment of the tamper evidencing device according to FIG. 11, except in assembled configuration and showing the first step in a process of securing a package or freight article.
Figure 21:
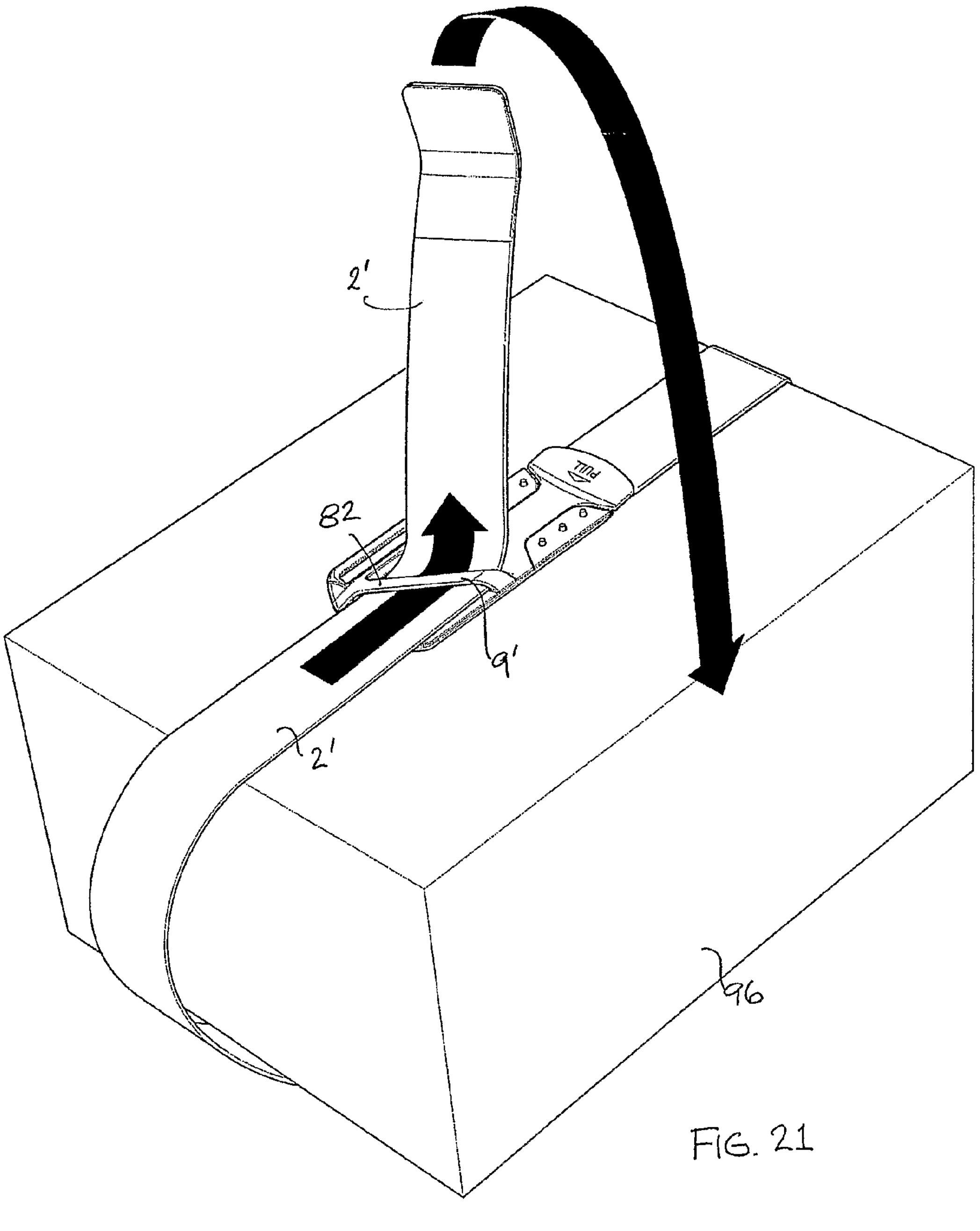
FIG. 21 shows a third step.
Figure 22:
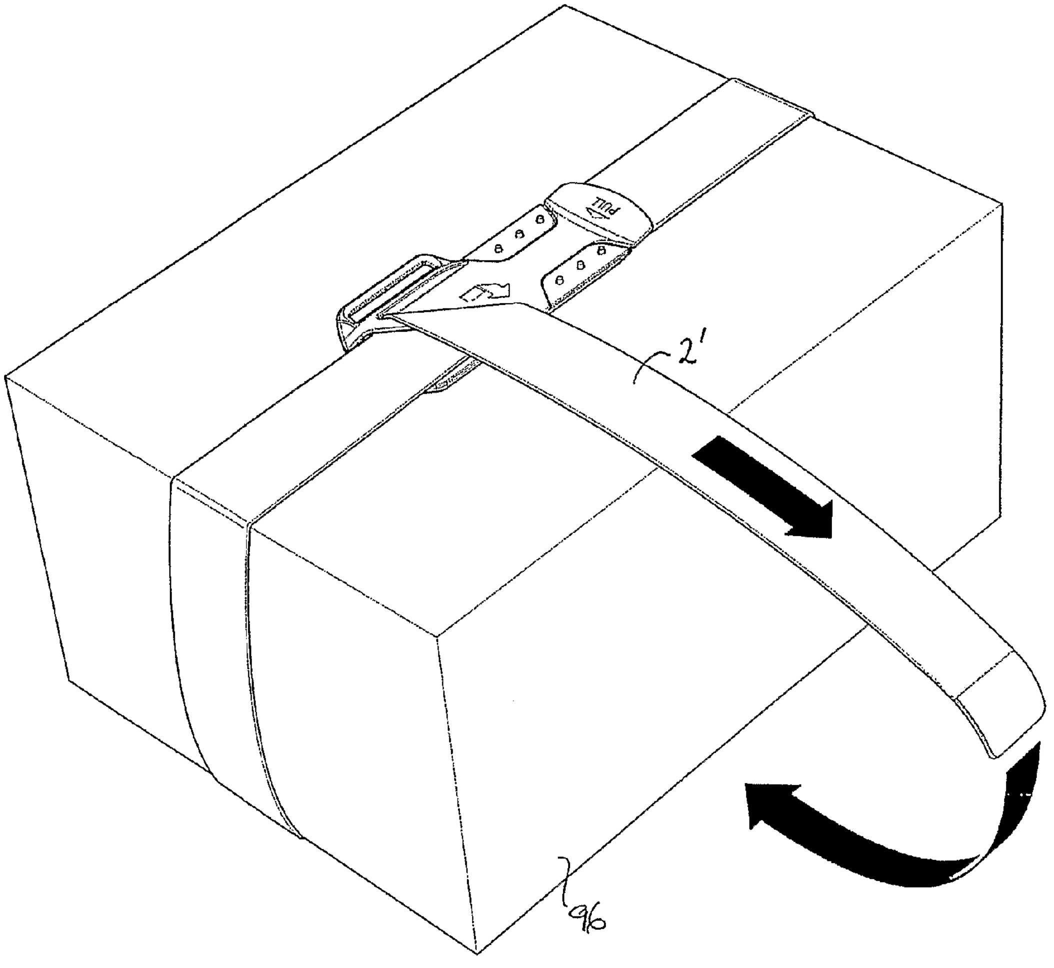
FIG. 22 shows a fourth step.
Figure 23:
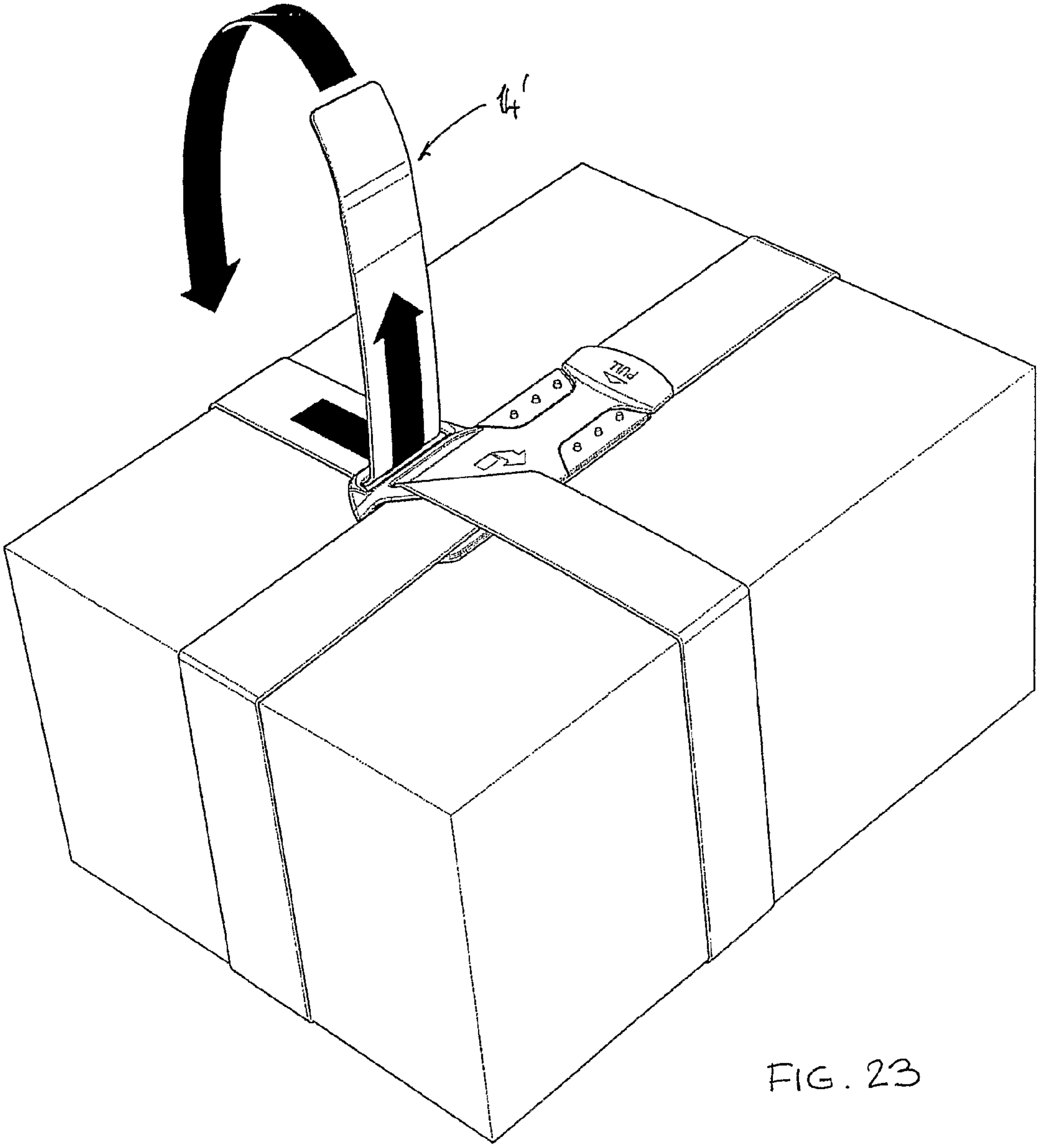
FIG. 23 shows a fifth step.
Figure 24:
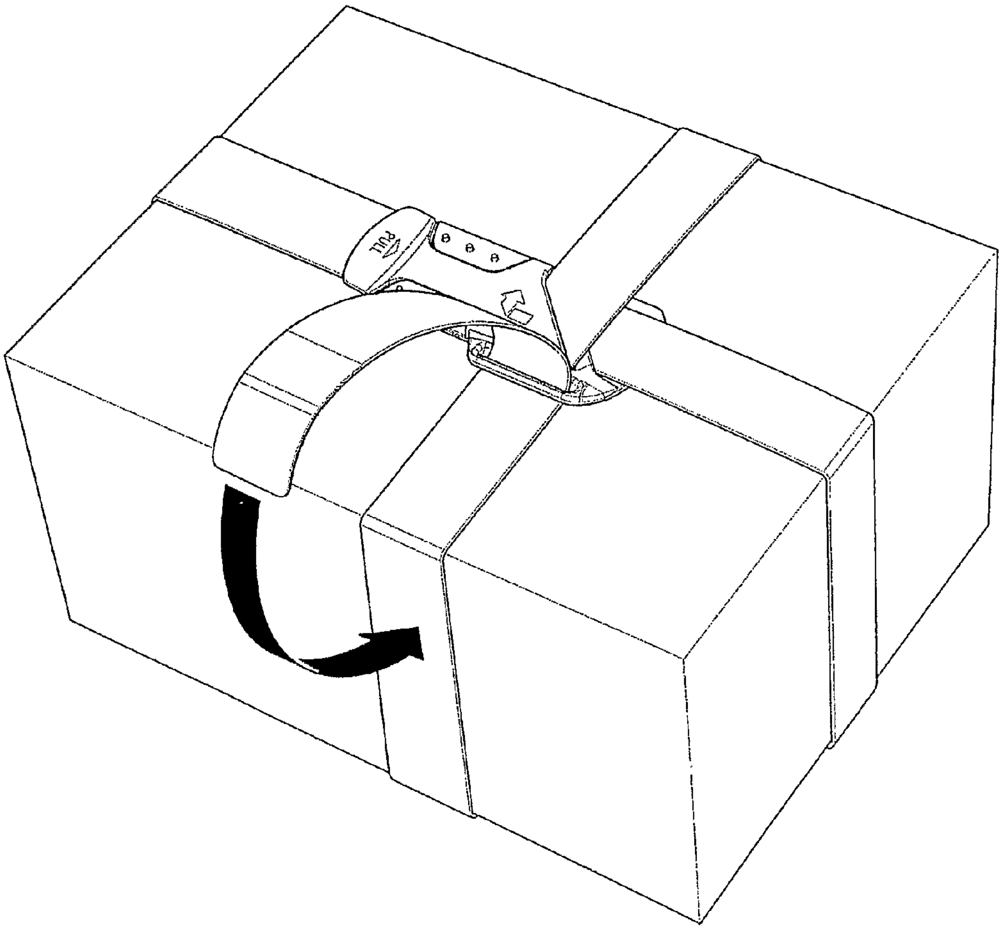
FIG. 24 shows a sixth step.

The use of the security device 1' according to the second preferred embodiment will now be described with reference to FIGS. 19 to 26. FIG. 19 illustrates one end of the security device 1' showing the buckle 6' which has been assembled with the composite strip 4' with the receipt stub 21' removed so that the remainder of the strip now defines a tamper evidencing band 2'. The outside of the rear part 32' is provided with a release backing 92 over the adhesive layer 94. This release backing 92 is removed so that the buckle 6' may be adhered to the package 96 in the manner illustrated in FIG. 20. The tamper evidencing band 2' is then extended around the package 96. The distal portion 14' is then threaded through the guide 9' to create a band around the package 96 as illustrated in FIG. 21. The band may be tightened by pulling on the tamper evidencing band 2'. As will be appreciated from FIG. 21, the bar 82 defining the guide 9' is arranged at a 45° angle to the incoming tamper evidencing band 2' so that when the strip is fed underneath bar 82, its direction can be reverted so that it lies against the edge of bar 82 which extends at a 45° angle to the incoming direction of the incoming tamper evidencing band 2'. This will guide the tamper evidencing band 2' to extend in the direction away from the guide 9' at a 90° angle to the incoming direction as shown in FIG. 22. The tamper evidencing band 2' can then be extended to form another band around the package 96, the second band extending at 90° to the first band. The distal portion 14' is then threaded through the loop 8' as shown in FIG. 23 and the second band is tightened around the package 96 as shown in FIG. 24.

Figure 25:
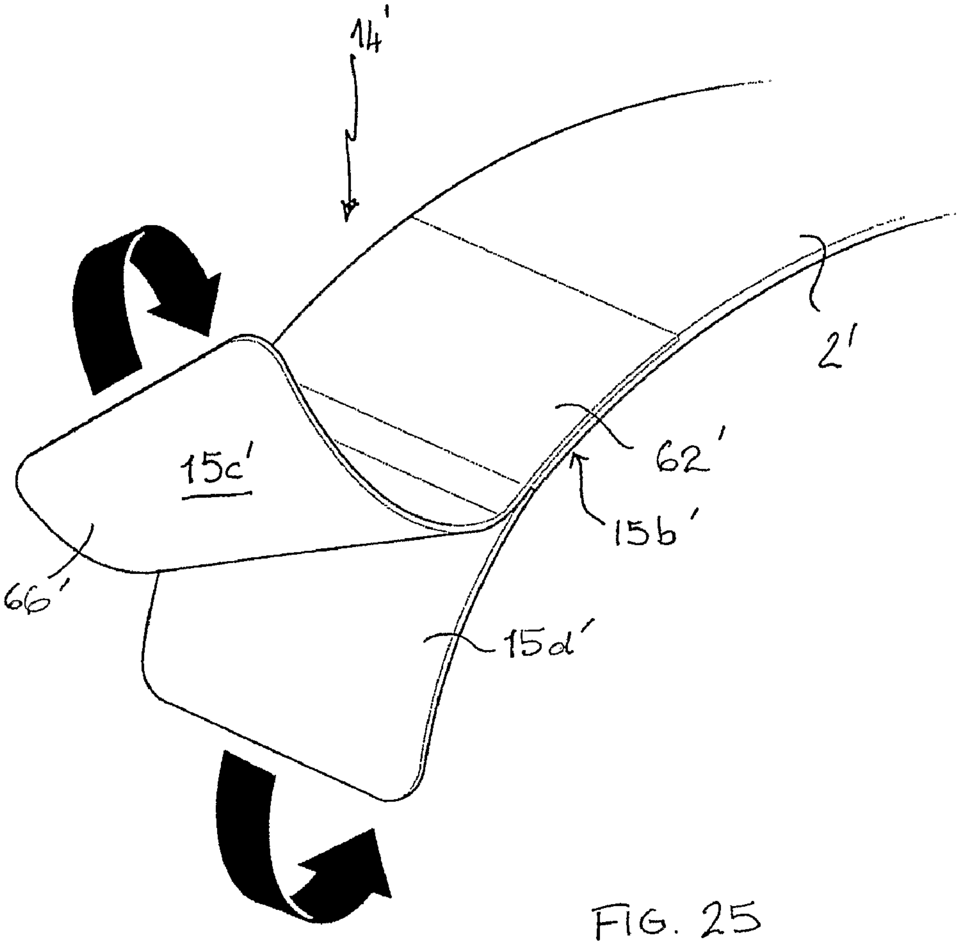
FIG. 25 shows a seventh step.
Figure 26:
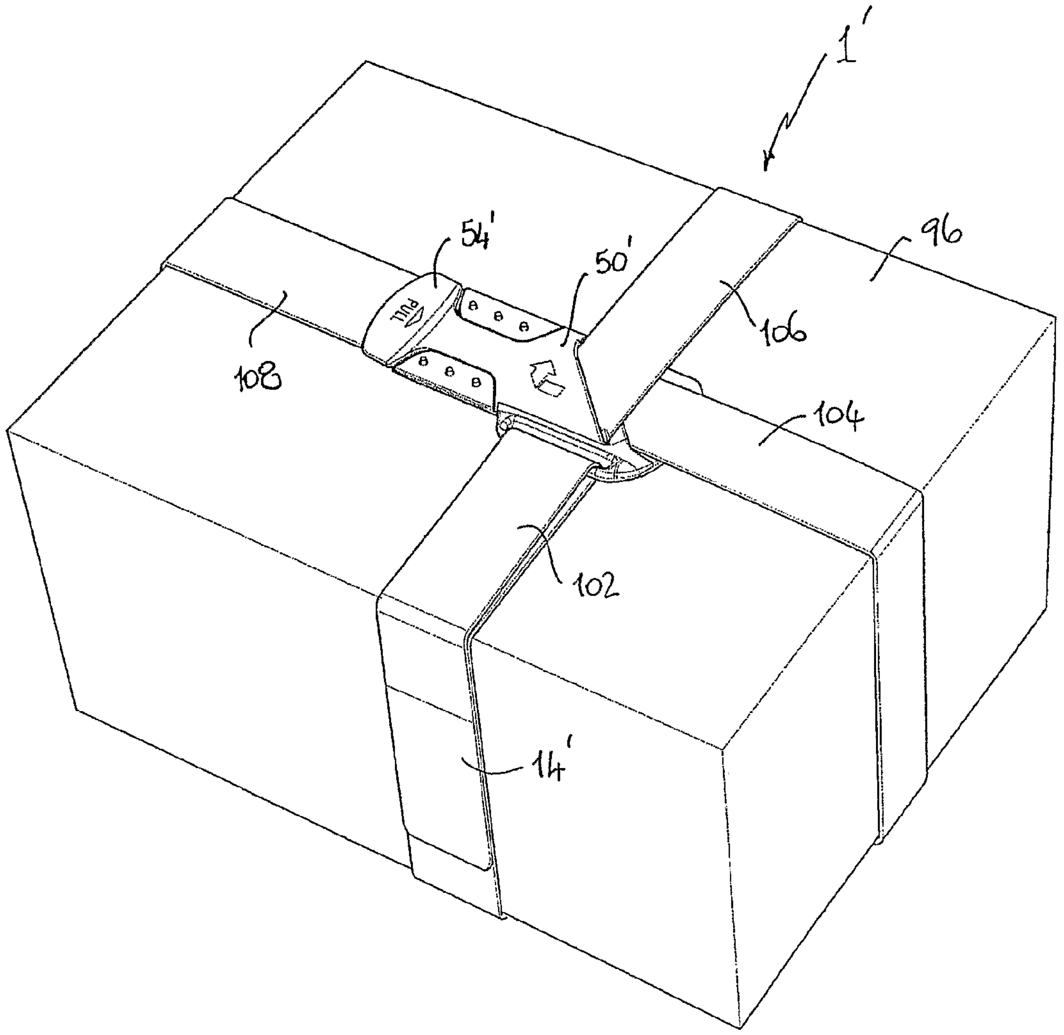
FIG. 26 shows an eighth step.

As illustrated in FIG. 25, the release backing **15*d*' corresponding to the residual portion 66' of the tamper evidencing film is then removed to reveal the adhesive 15*c*' on the tamper evidencing film. Additionally, the release backing 15*b*' corresponding to the adhesive 15*a*' is also removed. These two backing panels 15*b*' and 15*d*' may be one and the same. The distal portion 14' including the residual portion 66' of the tamper evident film 62' can then be secured back onto the tamper evidencing band 2' in the manner illustrated in FIG. 26**.

After securement, the distal portion 14' cannot be removed from the surface of the tamper evidencing band 2' without being visibly damaged in the manner explained above for the first embodiment.

In order to remove the security device 1' from the package 96, the user pulls on the release tab 54' which will separate the loop or guide defining portion 50' from the remainder of the buckle. It will be appreciated that band portions 102, 104, 106 are looped around the loop or guide defining portion 50'. On the other hand, band portion 108 is attached to the securement portion of the buckle. Therefore, with removal of the loop or guide defining portion 50', the band portions 102, 104, 106 will be freed to permit release thereby enabling access to the package 96. As described for buckle 6 in the earlier preferred embodiment, once the loop or guide defining portion 50' is separated from the remainder of the buckle, the buckle will be visibly damaged and cannot be reassembled or reattached, leaving clear evidence of tampering. The securement portion remains affixed to the package 96. Therefore, if the loop or guide defining portion 50' is removed intentionally (through misuse) or unintentionally (through damage), the tracking portion 88 will remain with the package 96.

Should the buckle 6' be formed without the described release function, then the encircling bands may be removed by breaking the seal formed by the adhesive **15*a*', 15*c*' on the distal portion 14' (which includes the tamper evident film 66') adhered to the tamper evidencing band 2'. As previously described, such removal will be evidenced by the band 2'**.

If sufficient force is applied to remove the buckle 6' from the article for any reason, then the frangible connections 90 which connects the tracking portion 88 to the buckle 6' will break. If at this time, the tamper evidencing band 2 has been released either by operation of the release tab 54' or by any other means, this will result in the removal of the remainder of the buckle 6' from the item while the tracking portion 88 remains attached to the package 96 by the securement portion, to enable continued tracking if need be.

The loss of part of the security device 1' will serve as an indication that the package 96 may have been tampered with. On the other hand, the arrival of the package 96 with the security device 1' intact will provide a means of indicating tamper-free transit of the package 96.

The claims defining the invention are as follows:

1. A security system comprising:

a tamper evidencing device for protecting an article having one or more zips with zip sliders and zip tabs, wherein breach of the device in use is evidenced by the device itself or the absence thereof, the tamper evidencing device including a unique identifier and an elongate band which encircles the article, the band incorporating one or more apertures or slits; and a zip securing portion securing the one or more zip sliders or zip tabs, the zip securing portion having a unique identifier corresponding to the unique identifier of the tamper evidencing device, wherein the zip securing portion is inserted through openings in adjacent zip tabs or zip sliders and secured to itself to form a zip tab coupling which is anchored to the tamper evidencing device by either the zip securing portion or one of the zip tabs being inserted through one of the one or more apertures or slits in the band, wherein once secured as such, removal or attempted removal is evidenced by at least one of the tamper evidencing device, the zip securing portion or the absence of either.

2. The security system as claimed in claim 1 also comprising a receipt portion for retention by a person responsible for the article, wherein the receipt portion includes a unique identifier corresponding to the unique identifier of the tamper evidencing device.

3. The security system of claim 2 wherein the unique identifier on at least one of the, band the receipt portion or the zip securing portion is borne on a portion of tamper evidencing material.

4. The security system as claimed in claim 3 wherein the tamper evidencing material comprises: a transparent substrate layer; a visible layer unevenly bonded to the substrate layer; an adhesive layer provided on the visible layer; and a release backing.

5. The security system of claim 2 wherein the receipt portion and the band are formed in an elongate strip and the receipt portion is separable from the band.

6. The security system of claim 1 wherein the zip securing portion and the band are formed in an elongate strip and the zip securing portion is separable from the band.

7. The security system as claimed in claim 6 wherein the strip comprises:

a first layer;

one or more reinforcing layers bonded to at least one side of the first layer; and adhesive provided on a first portion of the strip to selectively adhere the first portion of the strip onto the first layer of a second portion of the strip, wherein the first layer is such that removal or attempted removal of the first portion of the strip from the second portion of the strip causes the first layer to separate in an irregular or predetermined manner to reveal visual evidence of tampering.

8. The security system as claimed in claim 1 wherein the tamper evidencing device further includes:

a component for guiding the band about an article, the component being attached or attachable to the band and having a guide or loop such that the band may be looped in a first loop around an article and thereafter guided to extend therebeyond in a transverse direction to said first loop to form a second loop around the article.

9. The security system as claimed in claim 8 wherein the component is a buckle.

10. The security system as claimed in claim 1, further comprising:

a tracking portion connected to and separable from the remainder of the tamper evidencing device by a separable connection, the tracking portion being provided with adhesive to secure the tracking portion to the article, wherein the bond of the adhesive is stronger than the separable connection such that the removal of the remainder of the device from the article allows the tracking portion to remain for continued tracking of the article.

11. The system as claimed in claim 10 wherein the separable connection is in the form of frangible connections between the tracking portion and the remainder of the device.

12. The security device of claim 1 wherein the one or more apertures or slits are arranged along one or both margins of the band.

13. The security device as claimed in claim 12 wherein the one or more apertures or slits extend along the whole length of the band.

14. A method of securing an article having one or more zips with zip sliders and zip tabs, the method comprising:

providing a tamper evidencing band having a unique identifier and one or more apertures or slits;

providing a zip securing portion, the zip securing portion having a unique identifier corresponding to the unique identifier of the tamper evidencing band;

encircling an article with the band;

forming a zip tab coupling by inserting the zip securing portion through openings in adjacent zip tabs or zip sliders and securing the zip securing portion to itself; and anchoring the zip tab coupling to the tamper evidencing band by either the zip securing portion or one of the zip tabs being inserted through one of the one or more apertures or slits in the band, wherein once secured as such, removal or attempted removal is evidenced by at least one of the tamper evidencing band, the zip securing portion or the absence of either.

15. The method as claimed in claim 14 wherein there are a plurality of apertures or slits spaced lengthwise along a substantial portion of the length of the band.

16. The method as claimed in claim 15 wherein the spaced apertures are arranged along one or both margins of the band.

17. The method as claimed in claim 14 wherein the one or more zip securing portions comprise cable ties.

18. The method as claimed in claim 14 wherein the band and the zip securing portion are formed of an elongate strip, the zip securing portion being separable from the band, the method including separating the zip securing portion from the band.

19. The method as claimed in claim 18 wherein a receipt portion having a unique identifier corresponding to the unique identifier of the band is also formed of the strip, the method including separating the receipt portion from the band.

* * * * *